United States Patent

Yamanaka et al.

[11] Patent Number: 5,815,072
[45] Date of Patent: Sep. 29, 1998

[54] VEHICLE DISPLAY DEVICE

[75] Inventors: Osamu Yamanaka, Aichi-Ken; Makoto Tamaki, Kani; Takemasa Yasukawa, Ichinomiya; Hiroshi Sugihara, Ogakai; Kazushi Noda, Ichinomiya; Yoshio Sano, Gifu-ken; Tetsuo Tanabe, Ogaki, all of Japan

[73] Assignee: Toyoda Gosei Co., Ltd., Aichi-ken, Japan

[21] Appl. No.: 890,304

[22] Filed: Jul. 9, 1997

[30] Foreign Application Priority Data

Jul. 10, 1996 [JP] Japan .................................. 8-180774
Jul. 10, 1996 [JP] Japan .................................. 8-180775

[51] Int. Cl.$^6$ ...................................... B60Q 1/00
[52] U.S. Cl. .................. 340/461; 340/438; 340/441; 362/61
[58] Field of Search .................... 340/461, 462, 340/428, 438, 439, 441, 458, 815.65, 815.66; 362/23, 61

[56] References Cited

U.S. PATENT DOCUMENTS 5,583,484  12/1996  Asano ...................................... 340/461

FOREIGN PATENT DOCUMENTS 60-164371  8/1985  Japan .
61-3422  1/1986  Japan .
4-12474  1/1992  Japan .

Primary Examiner—Jeffery A. Hofsass
Assistant Examiner—Daryl C. Pope
Attorney, Agent, or Firm—Cushman, Darby & Cushman IP Group of Pillsbury, Madison & Sutro LLP

[57] ABSTRACT

A vehicle display device such as a speed meter including indicators, many segments illuminated in two or more colors by plural LEDs and an indicator control circuit. The indicators dispose the segments so as to display a variable such as a car speed in a bar graph or in the form of a number. The indicator control circuit displays the variable by controlling the lighting of the LEDs and changes an emitted light color of indication based on a fixed color changing reference value in accordance with a value of the variable. The control circuit controls a duty ratio of a supply current or a current value in a predetermined set value range determined on the basis of the color changing reference value. Namely, brightness of the emitted light color before a color change is gradually decreased, while brightness of the emitted light color after the color change is gradually increased.

19 Claims, 20 Drawing Sheets

FIG.6

| Vt−VB | Duty ratio control rate (%) | |
|---|---|---|
| | LED of emitted light color before color change | LED of emitted light color after color change |
| (VL−VB) ∫ (VL−VB)·3/5 | 85 | 15 |
| ∫ (VL−VB)·1/5 | 65 | 35 |
| ∫ (VH−VB)·1/5 | 50 | 50 |
| ∫ (VH−VB)·3/5 | 35 | 65 |
| ∫ (VH−VB) | 15 | 85 |

VEHICLE DISPLAY DEVICE

This present application is based on and claims priority from Japanese Patent Applications 8-180774, 8-180775, both filed on Jul. 10, 1996, the contents of which are incorporated by reference.

BACKGROUND OF THE INVENTION

1. Field of the Invention

This invention relates to a vehicle display device such as a speedometer, tachometer, fuel gauge and so on, and particularly to a vehicle display device which uses not less than two colors of LEDs and displays quantities of information such as car speed, engine rotating speed, and remaining fuel by changing emission color.

2. Description of the Related Art

In a vehicle, many kinds of display device meters are provided for informing a driver of some state of the car and, for preventing a danger during running, and for securing safety. Above all, the following devices which indicate a quantity changing every moment are especially important for vehicle safety during running: a speedometer indicating vehicle running speed, a tachometer indicating the engine rotating speed, and a fuel gauge showing the remaining fuel.

These display devices each include a dial provided with a scale showing the quantity corresponding to a pointer. The pointer rotates according to the value of the car speed, engine rotating speed, remaining fuel, and the like. As for the indicating style, a popular one is an analog type indicating the quantity by a position of the pointer on the scale. With the progress of electronics, high grading and diversifying of the car, another indicating style also has been adopted in recent years; this is a digital type which displays the car speed as a numeral value by a 7-segment display or the like. Otherwise, there is a graphical display which shows the engine rotating speed, remaining fuel and so on by a zone or bar graph with many lined up segments.

Concretely, there are some types which use a fluorescent character display tube or a liquid crystal display; however, such digital indication style generally uses the LED which is a small semiconductor emission element. Each of the segments is mounted with the LED and selectively lit, so that the quantity of the car speed and so forth are shown by the number, bar graph, or the like. When controlling this light emitting display, in the case of the car speed, a signal from a speed sensor, such as a photoelectric speed sensor provided on a transmission, is computed by a custom IC, microprocessor, or the like. Then, the LED of a specific segment is lit based on the obtained speed data. Similar computing operations and light emitting display control are carried out, in case of the engine rotating speed by using a primary pulse signal of an ignition coil, and, in case of the remaining fuel, by performing A/D conversion for an output voltage of a fuel sender gauge.

In the number display or bar graph display of the digital vehicle display device, a specific single color is commonly used for indication. That is to say, each segment is provided with one LED, thereby being lit by one color of radiation of the LED. However, as for the bar graph display, it is suggested that an indicating color be changed to another color for showing danger or the like, if an indicated quantity exceeds a certain value. In this case, two kinds of LEDs are disposed on each segment, and the lighting operation of the LEDs is further controlled so that the indicating color changes around a certain value (i.e., a color-changing reference value given on the border).

For example, in a seven segment LED display which has seven bar shaped segments in the number 8 figure shape, numbers "0" to "9" are represented by the light emission of respective segments being appropriately controlled. Three seven segment displays are disposed side by side, so that the car speed (km/h) can be displayed with a maximum of three figures. The light emission of the LED is electronically controlled on the basis of the speed data obtained by a microcomputer or the like according to the signal of a sensor. This operation is done by calculating the car speed by counting the number of pulses for a fixed time period (e.g., 0.3 sec.) or by measuring the cycle of a speed pulse. Here the former approach is more popular.

The vehicle has warning lamps relating to the car speed and the remaining fuel in addition to the devices directly indicating the variables of car speed, engine rotating speed, remaining fuel and so on at all times during the running of the vehicle. These lamps are illuminated if the car speed exceeds a fixed value or if the remaining fuel is less than a fixed value, so that such abnormal conditions are displayed for warning.

Therefore, in the digital display device using the above LED design, it is possible to change the emitting color of the digital display indicated as a number or bar graph, to another one when the car speed or remaining fuel is more or less than a fixed value. Namely, two or more kinds of LEDs can be provided on each segment having different colors forming the digital display and selectively lit. Then, the variable is indicated while changing its display color at the fixed value around a reference value for changing color. Accordingly, the digital display can also indicate a warning by means of a warning lamp. As for the engine rotating speed display, it is possible to warn of an overload state of an engine by changing colors when exceeding a fixed value. In a warning indicator like the warning lamp, if the indicator changes colors between a normal time and a warning time, it is possible to positively display its normal state to confirm that the indicator is operating reliably.

However, the variables concerning the vehicle state change every moment. Then, if such a variable is displayed by changing color around the fixed value as the reference value for changing color, the display color is frequently changed in the case where the variable is near the reference value. As a result, the display flickers. This is especially remarkable at the time when the light emission display extends to a wide zone like the bar graph. For instance, when the car speed is represented by the bar graph and the reference value for changing color is set at 100 km/h, the display color frequently changes in the case where the car runs at a speed around the reference value on an expressway. So, flicker arises on the display and recognition of the vehicle speed gets worse although the driver is warned of the condition of being over the reference speed.

With the digital speedometer, particularly the one displaying the car speed as the numeral value by the 7-segment LED display or the like, a precise speed up to a figure of 1 km/h can be obtained and the displayed number size can be large enough. Accordingly, it has advantages in that reading mistakes and errors are less compared with those from the analog type in which the number size provided on the dial is limited. It is also advantageous in that it has a large degree of freedom for display shape and attachment, so that the best arrangement and plan are practicable in terms of a design, and so on.

However, as contrasted with the analog type where the driver is able to immediately recognize a rough speed from the pointer, the digital speedometer requires the driver not only to see it but also to read the displayed number in order to know the car speed. Moreover, the driver needs some time, though only a few seconds, to read and comprehend the displayed number, and there is an individual variation about the time required to read. Since car speed in and out of town fluctuates considerably, the changing number display makes its legibility much more difficult. Therefore, although the visibility of the digital meter may be essentially good, it may not necessarily be adequate for recognizing the indicated speed.

Lately, examination has been made of the placement of the speedometer on a center cluster having the best visibility as a center meter. In this case, the digital type is optimal, since it enables the large number to be displayed. However, the driver always sees around the digital display or recognizes it by his or her peripheral vision. So, it is preferable that the driver can understand the car speed to some extent, e.g., whether it is over a limiting speed or not if only he or she sees around the digital display.

As to the engine rotating speed or other variables usually displayed on an instrument panel, it is possible to display them digitally, because digital indication by number can provide an accurate value for the variables. However when the engine rotating speed is displayed by number, there can be numerous fluctuations during the running of the vehicle as in the case of the car speed. After all, there is a possibility that the variable can not be easily recognized.

SUMMARY OF THE INVENTION

It is a first object of the present invention to provide a vehicle display device that is able to display variables such as vehicle speed, engine rotating speed, remaining fuel, and the like by changing colors without a flicker.

It is a second object of the present invention to provide a vehicle display device that includes a vehicle digital meter device in which a vehicle state variable such as a speed can be known more easily.

A vehicle display device in one mode of the invention has an indicator displaying a variable concerning a vehicle state. The indicator is provided with plural LEDs lighting the indicator by two or more colors. An indicator control means controls light emission of the LEDs. Then, an emitted light color of the indicator is changed in accordance with a change of the variable around a color changing reference value corresponding to a fixed value of the variable.

A vehicle display device in another mode of the invention has an indicator displaying a variable concerning a vehicle state. The indicator is provided with plural LEDs lighting the indicator by two or more colors. An indicator control means controls light emission of the LEDs. Then, an emitted light color of the indicator is changed in accordance with a change of the variable around a color changing reference value corresponding to a fixed value of the variable. At this time, a current supplied to the LED is controlled in a predetermined set value range determined on the basis of the color changing reference value. Namely, brightness of an emitted light color before a color change is gradually decreased while brightness of an emitted light color after the color change is gradually increased.

A vehicle display device in still another mode of the invention has an indicator displaying a variable concerning a vehicle state. The indicator is provided with plural LEDs lighting the indicator by two or more colors. An indicator control means controls light emission of the LEDs. Then, an emitted light color of the indicator is changed in accordance with a change of the variable around a color changing reference value corresponding to a fixed value of the variable. At this time, an emitted light color of the indicator is varied in a hysteretic manner in a predetermined range based on the color changing reference value. Namely, when the value of the variable increases and decreases, light emission of a light color before a color change is continued beyond the color changing reference value.

A vehicle display device in still another mode of this invention has an indicator including many segments arranged so as to display a variable concerning a vehicle state in a number. A light emitting means includes two or more kinds of color changing LED radiating different hues of rays from each other. At least one of the segments and a periphery of the indicator is illuminated by the LEDs. An indicator control means displays a value of the variable on the indicator in a number by selectively illuminating the segments. The indicator control means controls one or more colors of the color changing LEDs, thereby orderly changing the emitted light color thereof in two or more colors according to the value of the variable.

Further objects and advantages of the invention will be apparent from the following description with reference to the accompanying drawings, wherein preferred embodiments of the invention are clearly shown.

BRIEF DESCRIPTION OF THE DRAWINGS

FIG. 6 is a table showing one example of a duty ratio control rate (%) selected in a duty ratio selecting step of the flowchart of FIG. 5;

DETAILED DESCRIPTION OF THE PREFERRED EMBODIMENTS

Figure 1:
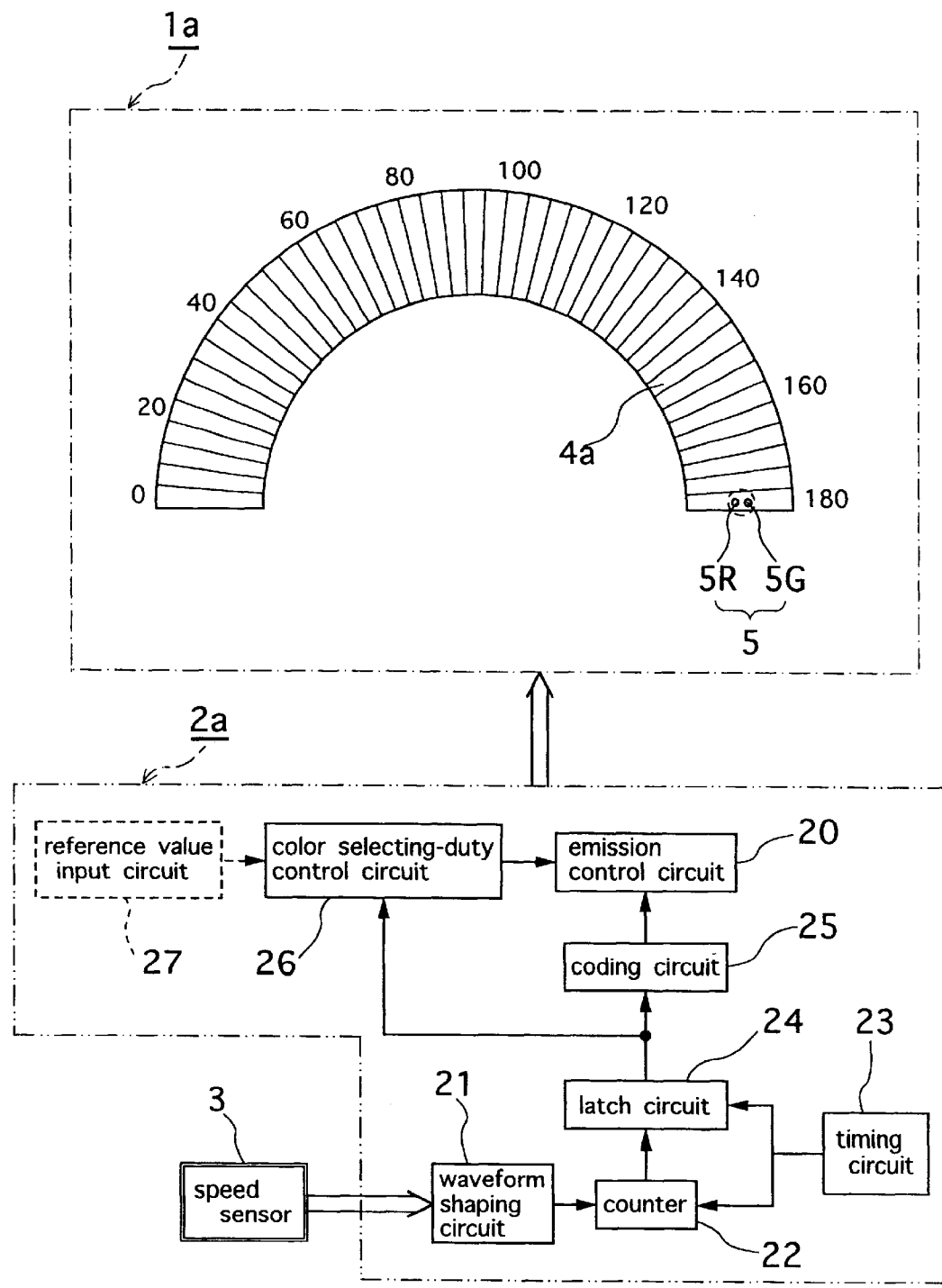
FIG. 1 is an explanatory view showing the construction of a vehicle display device of a first embodiment of this invention.
Figure 2:
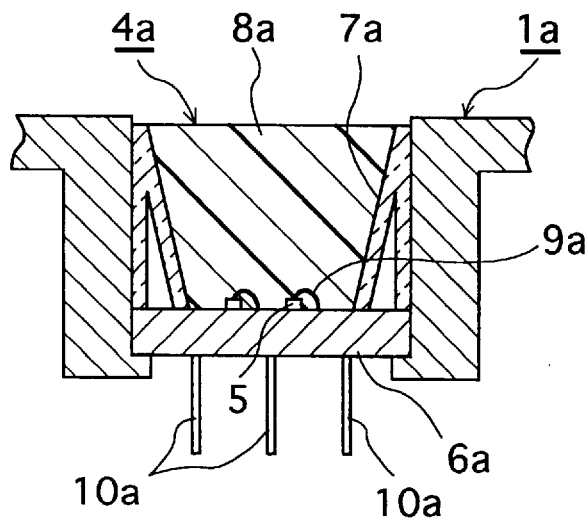
FIG. 2 is a sectional view showing the construction of each segment in the vehicle display device of the first embodiment of this invention.
Figure 3:
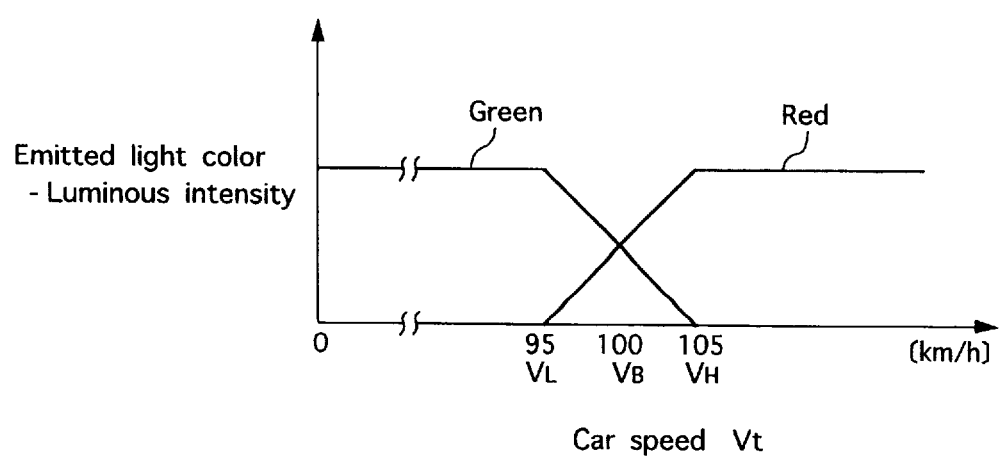
FIG. 3 is an explanatory view showing the relation between car speed and the brightness of each of the emitted light colors in the vehicle display device of the first embodiment of this invention.
Figure 4:
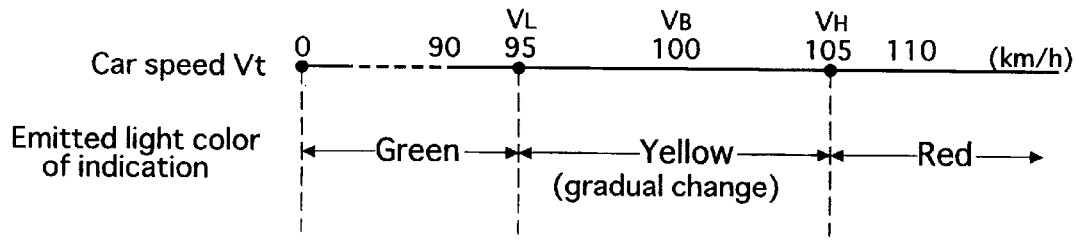
FIG. 4 is an explanatory view showing the relation between car speed and the color change of an indicator in the vehicle display device of the first embodiment of this invention.
Figure 5:
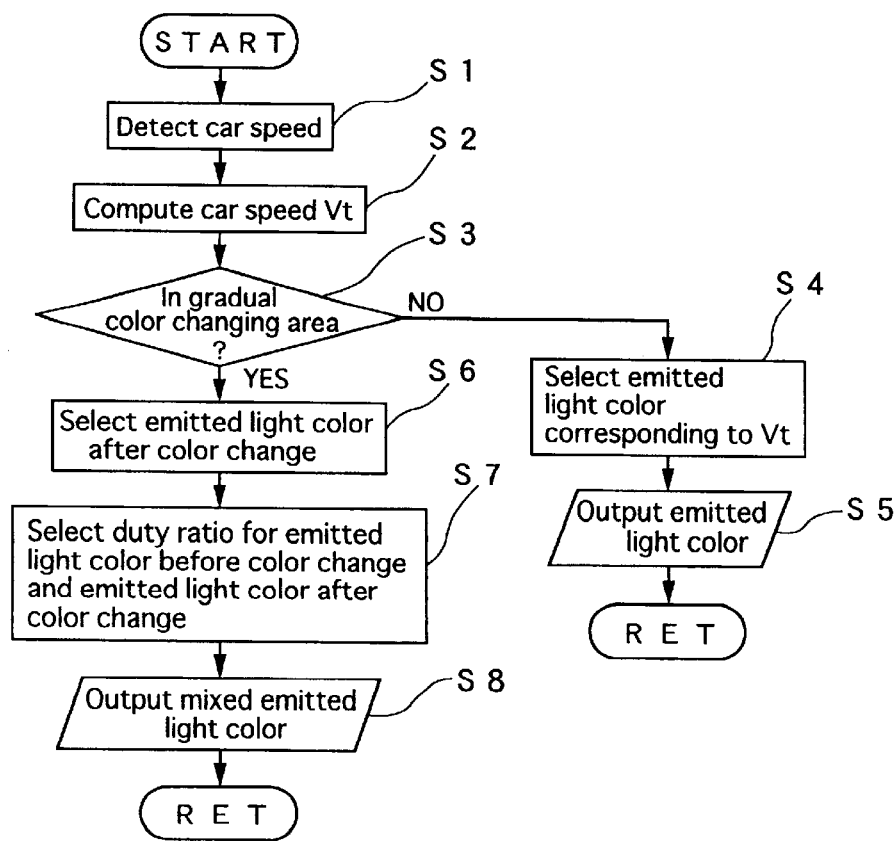
FIG. 5 is a flowchart showing the control program of a color selecting-duty control circuit in the vehicle display device of the first embodiment of this invention.

Referring to drawings, various embodiments of this invention will be described hereafter. Same or corresponding parts and elements are attached with the same or corresponding reference numerals or marks in each of the embodiments, and their redundant explanation is omitted.
First embodiment A first embodiment of this invention will be described. FIGS. 1–6 concern a vehicle display device of a first embodiment of this invention. FIG. 1 is an explanatory view showing the construction of the vehicle display device. FIG. 2 is a sectional view showing the construction of each segment in the vehicle display device. FIG. 3 is an explanatory view showing the relation between car speed and the brightness of each of the emitted light colors in the display device. FIG. 4 is an explanatory view showing a the relation between car speed and the color change of an indicator in the vehicle display device. FIG. 5 is a flowchart showing the control program of a color selecting duty control circuit in the vehicle display device. FIG. 6 is a table showing one example of a duty ratio control rate (%) selected in a duty ratio selecting step of the flowchart of FIG. 5.

As shown in FIG. 1, the vehicle display device of the first embodiment is embodied in a speedometer. The speedometer is an electronic one comprising an indicator 1a showing the car speed in a bar graph and an indicator control means 2a. The indicator control means 2a controls the indicator 1a to display the value of the car speed so that the speed value computed on the basis of a signal from a speed sensor 3 is displayed by bar graph. As for the speed sensor 3, the kinds used include a photoelectric speed sensor or a speed sensor using magnetic resistance element (MRE). The photoelectric speed sensor converts a transmission speed obtained by a cable into pulses for the car speed by a photo-interrupter.

The indicator 1a is made from an LED display and installed in a proper part of a vehicle instrument panel by itself and installed with another gauge and display devices. For example, the indicator 1a arranges ninety segments 4a having illuminated surfaces of substantially bar shape side by side in an arc shape, e.g., so as to display the speed from 0 km/h to 180 km/h in 2 km/h resolution by bar graph. Each segment 4a does not have to be positioned uniformly for every fixed speed; for instance, it is possible to arrange the segments for a more rough unit of resolution at scale marks of high-speed. In reality, the segments 4a are formed in substantially the same size so that each segment 4a emits light of the same brightness. (The brightness may be substituted with luminous intensity or luminance depending on a set condition.)

Such respective segments 4a are equipped with each of two or more kinds of LEDs having different hues from each other, thereby being able to be illuminated by two or more colors of emitted light. Concretely, a red 5R and a green LED 5G are disposed thereon. The LED 5R radiating red light is composed of gallium aluminum arsenide (GaAlAs), while LED 5G radiating green light is composed of gallium phosphide(GaP).

A detailed structure of the segment 4a is basically the same as a segment for an LED display providing a common single LED, except for a difference of a disposed LED number. Namely, the LEDs 5R, 5G are respectively bonded on their supporting board, i.e. a printed circuit board 6a as shown in FIG. 2. The LEDs 5R, 5G are surrounded by a reflecting board 7a which has an inside surface of white. The reflecting board 7a has an opening of substantially a bar shape as shown in FIG. 1 at an upper end. An empty space inside the reflecting board 7a is stuffed with a sealing resin 8a by being molded by a translucent resin material such as transparent epoxy resin. Such LED 5R, SG is in the form of an LED chip in detail, and a bonding wire 9a connects an outside electrode thereof with the printed circuit board 6a. Each segment 4a has two outer leads 10a for the LEDs SR, SG, respectively, and another outer lead 10a commonly connected to all the LEDs 5. Thus, the rays of the respective LEDs 5R, SG can be independently controlled each other.

The indicator control means 2a controls the emitted light of the segments 4a to display the car speed in bar graph. That is, it comprises an emission control circuit 20 which controls lighting of the LED 5 placed at a fixed segment 4a based on a value of the car speed obtained by computing the signal from the speed sensor 3. Then, the control circuit 20 controls the LED 5 to illuminate necessary segments 4a to display the speed value in bar graph.

Particularly, a detected signal (pulse) from the speed sensor 3 of photoelectric type or the like is input into a counter 22 via a waveform shaping circuit 21, as shown in FIG. 1. Thereafter, a timing circuit 23 counts the pulses between an opening gate time and a closing gate time (0.3 sec.). The control circuit 20 compares count data as car speed value data with stored data in a latch circuit 24. Only if their difference is not less than 1 km/h, the count data is coded at a coding circuit 25. It is sent to the emission control circuit 20, so that the new code is retained till the next timing of the timing circuit 23. The timing circuit 23 clears the previous data in the counter 22. In this way, a counting operation is repeated.

As mentioned above, the car speed is calculated and displayed by a bar graph. For example, a car speed at 40 km/h is shown as a nearly linear bar graph by lighting all the segments 4a in the range of the speed scale marks from "0" to "40". The bar graph changes its length in an arc figure from "0km" of scale marks in accordance with the value of the car speed. Therefore, a driver can know the car speed by reading a speed scale mark at which a top end of the lighting bar graph is located. Further, at a short glance around the mark, he or she can immediately recognize the approximate value of the car speed from its length.

The vehicle display device of this embodiment selectively controls lighting of the respective LEDs 5R, 5G disposed on each segment 4a. The emitted light color indicated by the bar graph is changed around a fixed color changing reference value according to the car speed. At this time, a current supplied to the LED 5 is controlled in a range of predetermined set value determined on the basis of the color changing reference value. Namely, brightness of an emitted light color before a color change is gradually decreased, while brightness of an emitted light color after the color change is gradually increased. The light of the LED 5 is dynamically lit by pulse current, and its duty ratio is controlled to control the current.

Therefore, the indicator control means 2a has a color selecting-duty control circuit 26. The circuit 26 selects necessary kinds of color between the red LED 5R and the green LED 5G at and around the fixed color changing reference value corresponding to a predetermined speed value on the basis of a car speed value data from a latch circuit 24. This means that the emitted light color of an indicator is selected accordingly. In addition, the circuit 26 controls the emission control circuit 20 in the range of the predetermined set value determined on the basis of the color changing reference value. Namely, the duty ratio is gradually decreased by reducing the pulse current supplied to one of the LEDs 5R, 5G emitting a light color before the color change, while the duty ratio is gradually increased by gaining the pulse current supplied to the other one of the LEDs 5R, 5G emitting a light color after the color change. The changing duty ratio can be practically controlled to zero by changing a pulse width, a pulse frequency or by changing both of them at the same time.

Concretely, a color changing reference value VB is set at "100 km/h", and a first set value VH is set at "105 km/h", and a second set value VL is set at "95 km/h" as shown in FIGS. 3 and 4. The emitted light color indicated by bar graph in the indicator 1a corresponds to a car speed value Vt. If the car speed value Vt is lower than "95 km/h" of the second set value VL, the green LED 5G generally showing a safety is lit. And, if the Vt is higher than "105 km/h" of the first set value VH, the red LED 5R generally showing a danger is lit. The duty ratio is controlled within a speed range of "10 km/h" between the first set value VH and the second set value VL. So, the light color changes from green to red is controlled little by little. Detailedly, an intensity of the emitted light color, i.e., a brightness of green is constant before the car speed Vt increases and reaches the second set value VL. However, when the speed Vt exceeds the VL, the brightness gradually decreases, and practically decreases to zero at the first set value VH.

On the other hand, the emitted light color of red gradually becomes brighter from the second set value VL, at which the brightness of red is substantially zero, to the first set value VH. The red emitted light is kept in the same brightness as that of the green emitted light under the second set value VL, after the car speed Vt exceeds the first set value VH. Such change of brightness to red is nearly proportional to the change of duty ratio.

Therefore, two colors are mixed little by little in the changing process of emitted light color from green (previous emitted light color) to red (next emitted light from green the above color). That is, the emitted color changes from yellow green to yellow (middle mixed color), orange and red in order. As shown in FIG. 3, intensity of respective colors of red and green changes in an opposite direction between the maximum value of the brightness and substantial zero value thereof. So, the total intensity of the mixed emitted light color is practically the same as respective single colors. By such mechanism, a gradual changing area of the emitted light color is formed between the first set value VH and second set value VL, thereby moderating a rapid changing of the emitted light color around the color changing reference value VB.

The control of the above color selecting-duty control circuit 26 is conducted in accordance with the flowchart of FIG. 5, for instance. In the figure, the circuit 26 selects LEDs 5G and 5R to be lit and controls the duty ratio of the pulse current supplied to each LED 5G, 5R, corresponding to the car speed value Vt.

In FIG. 5, an output of the speed sensor 3 is detected through the waveform shaping circuit 21 in step S1, and the car speed Vt is computed at the counter 22 based on the detected signal in step S2. It is decided whether the car speed Vt is within the color gradual changing area, i.e., between the first set value VH and the second set value VL in step S3. Then, the emitted light color is selected according to the car speed Vt in step S4, if the speed value is out of the color gradual changing area. The selected one of the LEDs 5G, 5R is lit in step S5. In detail, if the car speed value Vt is lower than the second set value VL, the green LED 5G is lit and displays the bar graph of the indicator 1a in green. On the other hand, if the Vt is higher than the first set value VH, the red LED 5R is lit and displays the indicator 1a in red.

In the next case, the present car speed Vt is decided to be within the color gradual changing area between the first set value VH and the second set value VL in step S3. The emitted light color after the color change is selected in step S6. Then, the duty ratios are selected for the emitted light color before color change and the emitted light color after color change, respectively, in step S7. Such selection of duty ratio in step S7 is carried out as shown in FIG. 6. Namely, each duty ratio control rate (%) defined in the table corresponds to a value of the difference between the car speed Vt and the color changing reference value VB [Vt−VB]. The duty ratio control rate (%) is previously set concerning the pulse current supplied to respective LEDs emitting respective light colors before color change and after color change, according to the above speed difference. As shown in FIG. 6, the value of [Vt−VB] is classified in five levels. The duty ratio control rate of the pulse current for the LED before color change (green LED 5G) and the LED after color change (red LED 5R) is set in accordance with ranges of respective values. For example, duty ratio of the green LED 5G to red LED 5R is 85% to 158 which is an initial value, when the car speed Vt is near the second set value VL. The duty ratio is controlled in half-and-half (508 to 508), when the car speed Vt is around the color changing reference value VB (middle value of the first set value VH and second set value VL). Thus, when the car speed Vt is in the gradual color changing area, the mixed color of red and green is controlled into predetermined one based on the selected duty ratio control rate corresponding to the car speed Vt. Then, such predetermined mixed color of light is output or emitted in step S8.

It is preferable to divide the gradual color changing area into level is [Vt−VB] as fine as possible. Thereby, the color change can be graduated more when the brightness of the emitted light color is changed as shown in FIG. 3. Further, it is possible to properly decide the set range of the gradual color changing area, i.e. from VH as its maximum value to VL as its minimum value, in accordance with a changing quantity of the actual vehicle speed.

Moreover, it is possible to change the color changing reference value VB while changing the set range of the gradual color changing area. That is, as shown by a dotted line in FIG. 1, a reference value input circuit 27 is provided in addition. A user can input a desired value of the first set value VH and the second set value VL through the circuit 27 so as to change them appropriately. Like the above embodiment, the changed values VH and VB become new reference values for deciding a color when the circuit 26 controls the emitted light color of indication. With such modification, the color changing reference value VB may be set at speed limit of a road on which the car is running, for example. In this case, if the current speed exceeds the speed limit, the change of the emitted light color can be recognized as a warning indication.

The vehicle display device of the present embodiment changes the emitted light color of the car speed display shown by bar graph around the fixed color changing reference value in accordance with the car speed. Therefore, the car speed display can be used for warning by the color change, too. The change of the emitted light color is graduated via the mixed colors of the light color before color change and the light color after color change, in the fixed range of set value decided based on the color changing reference value. Therefore, it is possible to moderate a frequent color change, in case the car is running at the speed around the color changing reference value. Namely, it is possible to display the vehicle speed by the changing color without a flicker.

Second embodiment

Figure 7:
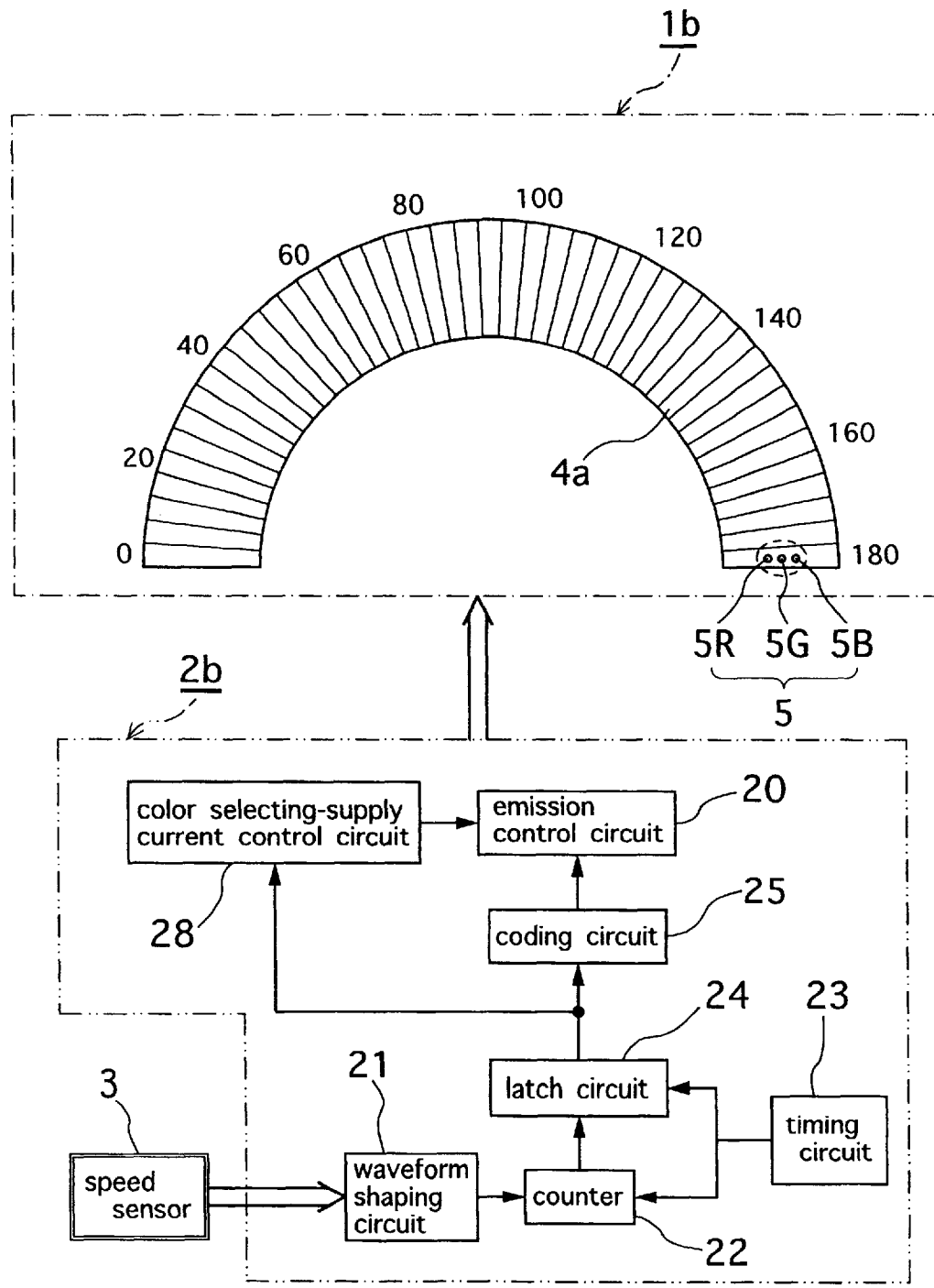
FIG. 7 is an explanatory view showing the construction of a vehicle display device of a second embodiment of this invention.
Figure 8:
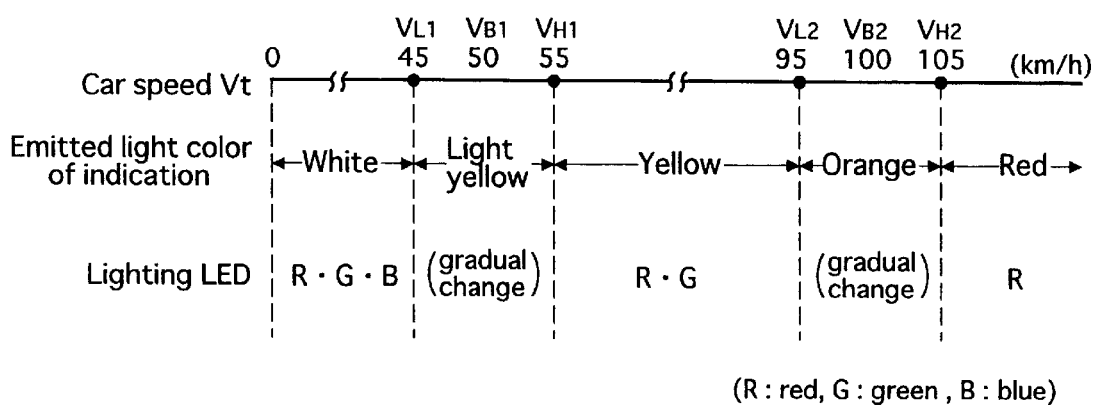
FIG. 8 is an explanatory view showing one example of an emitted light color change in the vehicle display device of the second embodiment of this invention.

FIG. 7 is an explanatory view showing the construction of a vehicle display device of a second embodiment of this invention. FIG. 8 is an explanatory view showing one example of an emitted light color change in the vehicle display device.

As shown in FIG. 7, the vehicle display device of the second embodiment is embodied as a speedometer. The speedometer is an electronic one comprising an indicator 1b showing the car speed in bar graph and an indicator control means 2b, similarly to the first embodiment in FIG. 1. The indicator control means 2b controls the indicator 1b to display a value of the car speed so that the speed value computed on the basis of a signal from a speed sensor 3 is displayed by bar graph.

In detail, the indicator 1b has the same construction as the indicator 1a of the first embodiment except for these next points. One point is that, the indicator 1b includes LEDs 5 of three kinds, i.e., a red LED 5R, a green LED 5G, and a blue LED 5B radiating light of red, green and blue, respectively, which are the three primary colors of light. The blue LED 5B can be comprised of III group nitride semiconductor ($In_xAl_yGa_{1-x-y}N$, wherein $0 \leq x$, $y \leq 1$) which can get comparatively high brightness, for example. Such three colors of LEDs become a mixed color of white, when lighting at the same time. So, the LED 5 can be lit by each single color or by a combined color, and the segments 4a can be illuminated by many emitted light colors. The other point is that, the indicator control means 2b has a color selecting-supply current control circuit 28 in place of the color selecting-duty control circuit 26. Except for the above points, it has the same construction as that of the indicator control means 2a of the first embodiment. Namely, the car speed is obtained by computing the signal from the speed sensor 3, and the control means 2b controls lighting of the LED 5 placed at a fixed segment 4a based on a value of the car speed. And its speed value is displayed in bar graph.

In this embodiment, the indicator control means 2b selectively controls lighting of the respective colors of LED 5 disposed on each segment 4a just as the first embodiment. The emitted light color indicated by the bar graph is changed around a fixed color changing reference value according to the car speed. At this time, a current supplied to the LED 5 is controlled in a range of predetermined set values determined on the basis of the color changing reference value. Namely, brightness of an emitted light color before a color change is gradually decreased, while brightness of an emitted light color after the color change is gradually increased. The supplied current to the LED is controlled by a duty ratio in case of the first embodiment. However, it is controlled by a current value in this embodiment. In detail, the current value is gradually decreased by reducing the current supplied to the LED 5 emitting light before the color change. The current value is gradually increased by gaining the current supplied to the LED 5 emitting light after the color change.

As stated above, the indicator control means 2b of this embodiment is further provided with the color selecting-supply current control circuit 28. And the emitted light color of indication is controlled to change according to the car speed. Such controlling operation can be performed just as the one in the first embodiment by substituting the current value for the duty ratio in FIGS. 5 and 6, for instance.

Such indicator control means 2b can change the emitted light color displayed by bar graph of the indicator 1b in accordance with the car speed, as shown in FIG. 8. Here, the color changing reference values are set at "50 km/h (VB1)" and "100 km/h (VB2)", respectively, thereby changing the emitted light color of indication to white, yellow, and red one after another. The emitted light gradually varies its color from the color before color change to the color after color change at each color changing point through their mixed colors. Concretely, the emitted light color is made into white at a low speed level of a vehicle by lighting the red LED 5R, green LED 5G, and blue LED 5B concurrently. The emitted light color is made into yellow at a middle speed level of the vehicle by lighting the red LED 5R and green LED 5G concurrently. The emitted light color is made into red at a high speed level of the vehicle by lighting only the red LED 5R. The emitted light color of indication is changed from white to yellow in a speed range of 10 km/h about the color changing reference value VB1 of "50 km/h". That is, the speed range defines a gradual color changing area between a first set value VH1 of "55 km/h" as an upper limit and a second set value VL1 of "45 km/h" as a lower limit. In such area, a brightness of white is gradually decreased, while a brightness of yellow is gradually increased. In detail, a current value supplied to the blue LED 5B is gradually decreased, and controlled to be zero at the first set value VH1. Simultaneously, the control circuit 28 gradually increases current values supplied to each red LED 5R and green LED 5G to a predetermined value in accordance with the decrease of the current value of blue LED 5B. Thereby, the brightness of the indicated color is made substantially constant. In this way, the emitted light color of indication is changed from white to light yellow and yellow little by little. The emitted light color of indication is changed from yellow to red in a speed range about the color changing reference value VB2 of "100 km/h". That is, the speed range defines a gradual color changing area between a first set value VH2 of "105 km/h" as an upper limit and a second set value VL2 of "95 km/h" as a lower limit. In such operation, the current value supplied to the green LED 5G is gradually decreased to zero, while the current value supplied to the red LED 5R is gradually increased to VH2. Accordingly, a brightness of yellow is gradually decreased, while a brightness of red is gradually increased. In this way, the emitted light color changes from yellow to red via orange as their middle mixed color little by little.

In the above example of changing the emitted light color for indication, the emitted light color is changed by three colors around two color changing reference values. Besides, the indicated color can be changed by two colors like the case of the first embodiment (FIG. 3), or can be changed by four colors or more. The reference value input circuit 27 may be provided on the color selecting-supply current control circuit 28 same as the first embodiment. In this case, a user can input desired values to change the color changing reference values (the first and second set values) appropriately.

The car speed is displayed by bar graph in the above vehicle display devices of the first and second embodiments. However, such display devices may be modified to display the car speed as it is by "zone display".

In the "zone display", only one segment placed at the speed scale mark corresponding to the actual car speed emits light for indication among many segments. As for another form of indication, it is possible to display it in number by a 7-segment display or the like, as described next.

Third embodiment

Figure 9:
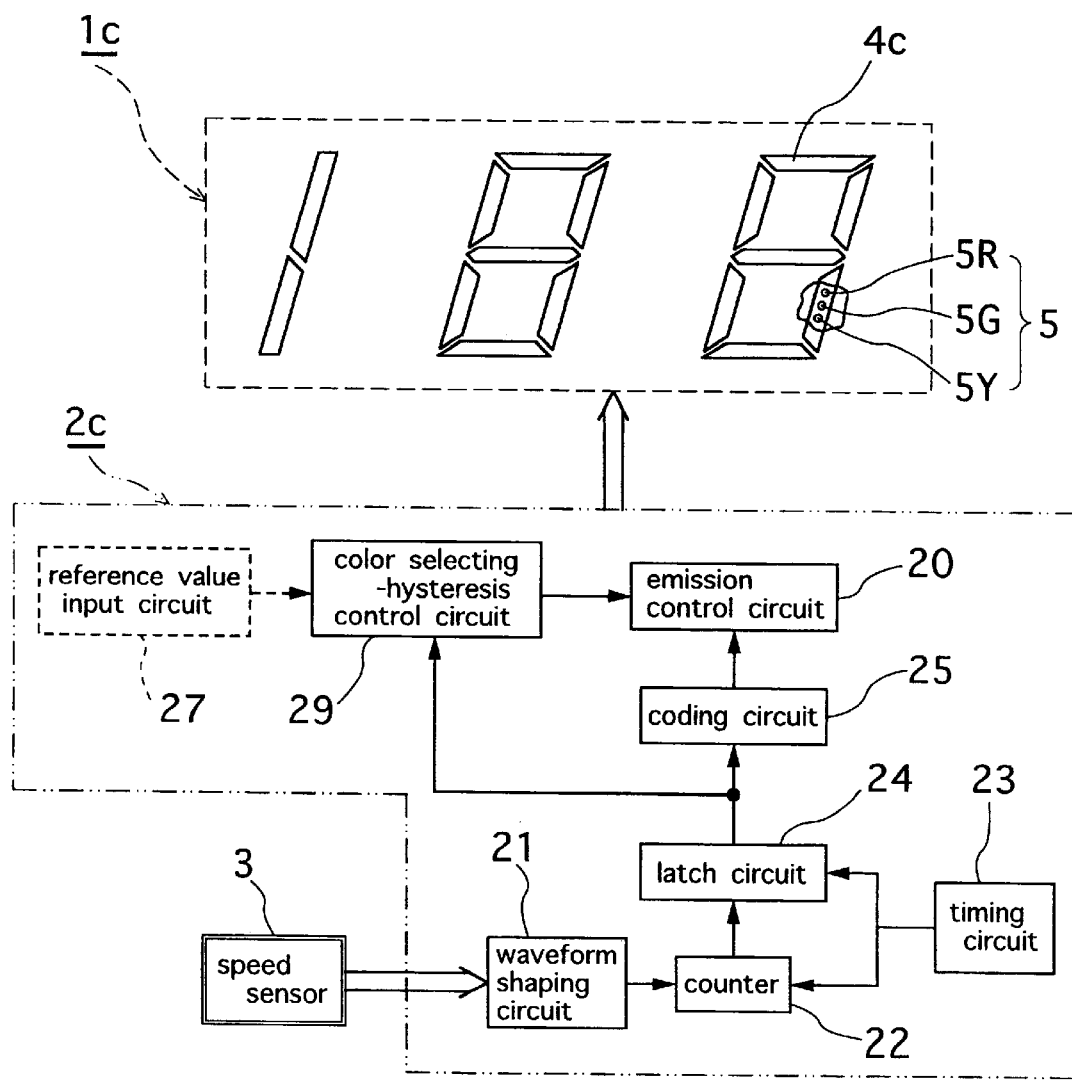
FIG. 9 is an explanatory view showing the construction of a vehicle display device of a third embodiment of this invention.
Figure 10:
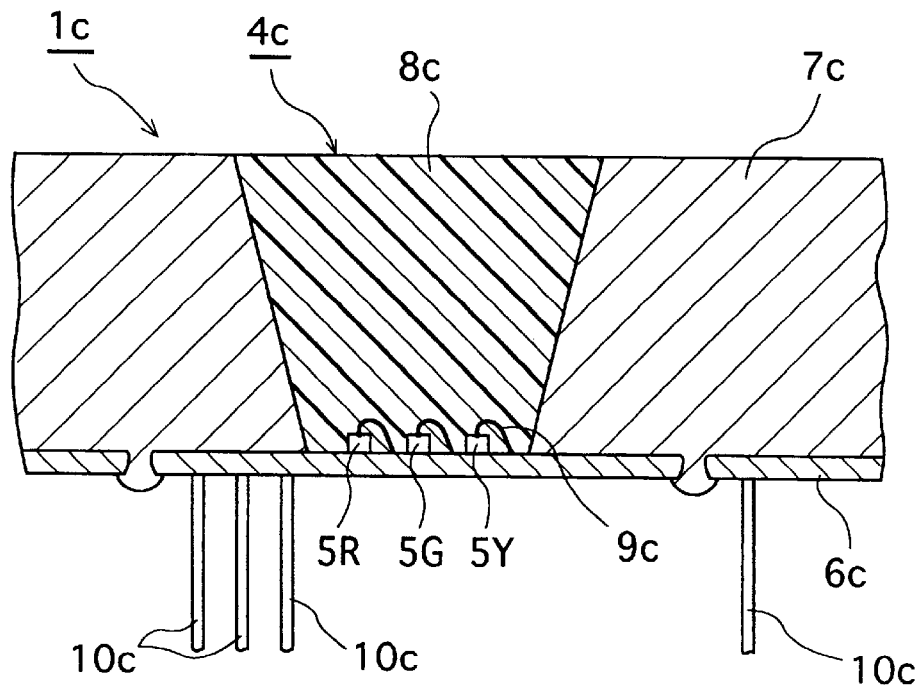
FIG. 10 is a sectional view showing the structure of each segment in the vehicle display device of the third embodiment of this invention.
Figure 11:
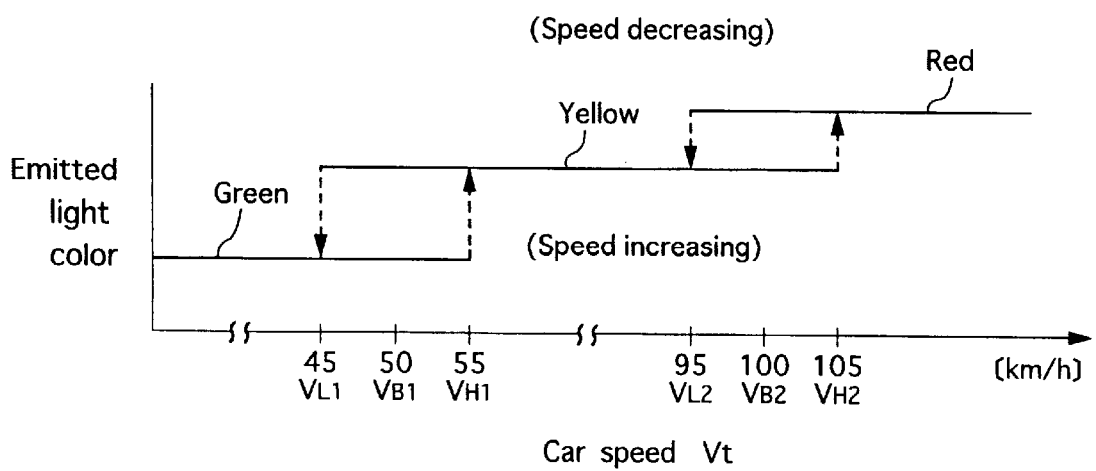
FIG. 11 is an explanatory view showing the relation between a car speed and an emitted light color of an indicator in the vehicle display device of the third embodiment of this invention.
Figure 12:
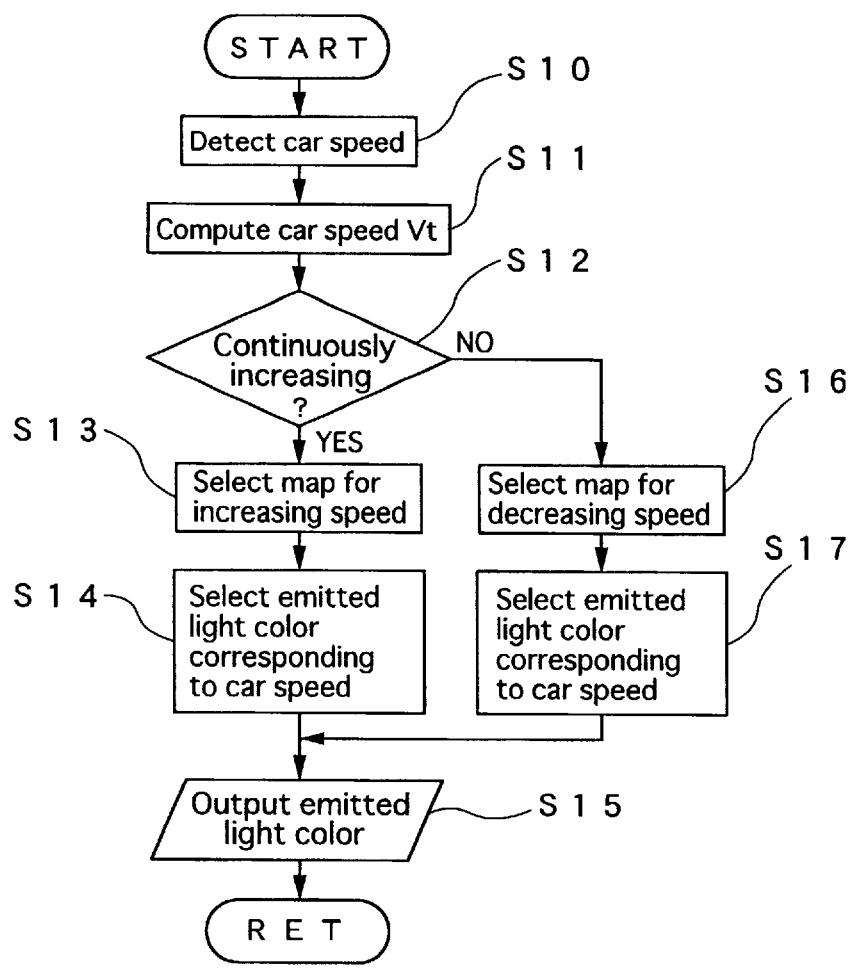
FIG. 12 is a flowchart showing the control program of a color selecting-hysteresis control circuit in the vehicle display device of the third embodiment of this invention.

FIGS. 9–12 concern a vehicle display device of a third embodiment of this invention. FIG. 9 is an explanatory view showing the construction of the vehicle display device. FIG. 10 is a sectional view showing the structure of each segment in the vehicle display device. FIG. 11 is an explanatory view showing a relation between a car speed and an emitted light color of an indicator in the vehicle display device. FIG. 12 is a flowchart showing the control program of a color selecting-hysteresis control circuit in the vehicle display device.

As shown in FIG. 9, the vehicle display device of the third embodiment is embodied as a digital speedometer which displays car speed as a real numerical value. The speedometer comprises an indicator 1c showing the car speed as number and an indicator control means 2c, similarly to the first embodiment in FIG. 1. The indicator control means 2c controls the indicator 1c to display the car speed so that the speed value computed on the basis of a signal from the speed sensor 3 is displayed by number.

The indicator 1c is constructed of a segment 4c having a light emitting surface of a bar shape. Such many segments 4c are arranged therein so as to display the cat speed (km/h) in numerical values from "0" to "199".

Namely, the first figure and the second figure of the numerical values are respectively formed of a 7-segment LED display arranging seven segments 4c into a shape of number "8". Then, a specific segment 4c is illuminated by a lighting of an LED 5 among many segments, thereby being able to display respective numbers from "0" to "9". However, the third figure can display only the number "1" with two segments 4c arranged vertically. The segments 4a are formed in substantially the same size so that each segment 4c emits light of the same brightness.

Each of the segments 4c is provided with the LED 5 radiating two or more colors having rays with hues different from one another. The LED has a red LED 5R radiating red light, a green LED 5G radiating green light, and a yellow LED 5Y radiating yellow light. So it can illuminate each segment by red, green and yellow. Although the yellow is obtained by the mixed color of red and green as mentioned in the former embodiments, this embodiment uses the independent yellow LED 5Y to facilitate a color controlling. The yellow LED 5Y may be composed of gallium arsenide phosphide (GaAsP) crystal, for example.

A detailed structure of such segment 4c is basically the same as the one forming a 7-segment display having one LED, and practically the same as the one of the segment 4a forming the above graph indication as shown in FIG. 2, except for the number of the LEDs. Namely, the LEDs 5R, 5G, 5Y are respectively bonded on their supporting board, i.e., a printed circuit board 6c as shown in FIG. 10.

The LEDs 5R, 5G, 5Y are surrounded by a reflecting board 7c which has an inside surface of white. The reflecting board 7c has an opening of the bar shape as shown in FIG. 9 at an upper end. An empty space inside the reflecting board 7c is stuffed with a sealing resin 8c by being molded by a translucent resin material such as transparent epoxy resin. Such LED 5R, 5G, 5Y is in the form of an LED chip in detail, and a bonding wire 9c connects an outside electrode thereof with the printed circuit board 6c. Each segment 4c has three outer leads 10c for the LEDs 5R, 5G, 5Y, respectively, and another outer lead 10c commonly connected to all the LEDs 5. Thus, the rays of the respective LEDs 5R, 5G, 5Y can be controlled independently of each other.

The indicator control means 2c controls the emitted light of such segments 4c to display the car speed in the form of a number. Further, the control means 2c has the same structure as that of the control means 2a except for the point that the control means 2c comprises a color selecting-hysteresis control circuit 29 in place of the color selecting-duty control circuit 26 of the indicator control means 2a in the first embodiment. Namely, the car speed is obtained by computing the signal from the speed sensor 3, and the control means 2c controls lighting of the LED 5 placed at a fixed segment 4c based on a value of the car speed. And its speed value is displayed in the form of a number.

As mentioned above, the third embodiment includes the color selecting-hysteresis control circuit 29 at the indicator control means 2c controlling the lighting of the LED 5. The circuit 29 selects the color of the LED 5 to be lit according to the car speed by deciding the car speed and changes the emitted light color displayed in number at a fixed color changing reference value. When changing the emitted light color, an emitted light color before color change is maintained in a fixed speed range determined based on the color changing reference value according to the car speed whether increasing or decreasing. Thereby, the circuit 29 controls the color change in a hysteretic manner.

Concretely, as shown in FIG. 11, two color changing reference values VB1, VB2 are set at "50 km/h" and "100 km/h". The emitted light color displayed by number of the indicator 1c changes from green to yellow and to red around the above two color changing reference values VB1, VB2 in accordance with a car speed Vt. For instance, the emitted light color changes from green to yellow at and around the reference value VB1 of "50 km/h" according to the car speed Vt. At this time, the emitted light color of indication is kept green which is an emitted light color before color change, as long as the car speed Vt is increasing to a first set value VH1 ("55 km/h"). Then, when the car speed Vt exceeds the first set value VH1 while increasing, such green becomes yellow. Conversely, the emitted light color of indication is kept yellow which is an emitted light color before color change, as long as the car speed Vt is decreasing to a second set value VL1 ("45 km/h"). Then, when the car speed Vt exceeds the second set value VL1 while decreasing, such yellow changes to green. That is, the emitted color change is conducted in the hysteretic manner in an area between the first set value VH1 and second set value VL1 (in this case, "45 km/h" to "55 km/h"). In other words, the emitted light color of indication maintains the emitted light color before color change, wherefore the area makes a hysteresis color changing area. The hysteresis color changing area corresponds to the gradual color changing area in the first and second embodiments. In this case, if the real car speed Vt changes in the area, the emitted light color of indication does not change.

Such controlling system of the emitted color change is similarly applied to the control system in the case where the emitted light color changes from yellow to red or red to yellow at the color changing reference Value VB2 at "100 km/h". In this case, another hysteresis color changing area is formed between a first set value VH2 of "105 km/h" and a second set value VL2 of "95 km/h", while determined based on the color changing reference value VB2. The emitted light color before color change does not change, when the car speed Vt varies in the above area. Namely, it is not until the car speed Vt is over the area that the emitted light color of indication changes into another color. So, even if the car speed Vt increases beyond "100 km/h" and changes around the "100 km/h" while a car is running on a highway, the emitted light color of indication keeps yellow as long as the car speed Vt is not more than "105 km/h". However, once the car speed Vt is over "105 km/h" and changes from yellow to red as the indicated light color, such red is maintained as long as the car speed Vt does not decrease from "95 km/h", even if the car speed Vt decreases in the area between "95 km/h" and "105 km/h". Thus, the emitted light color of indication changes in a hysteretic manner. Therefore, it is possible to moderate a frequent color change of the indicated color, in case the car speed Vt changes around the color changing reference value. Namely, it is possible to display the vehicle speed by the changing color without a flicker.

Next, it will be described about the flowchart of FIG. 12, for example. The above emitted light color of indication can be controlled by the color selecting hysteresis control circuit 29 in the next program.

In FIG. 12, an output of the speed sensor 3 is detected through the waveform shaping circuit 21 in step S10, and the car speed Vt is computed at the counter 22 based on the detected signal in step S11. The control means 2c selects the emitted light color (the color of the LED to be lit) according to the car speed Vt as follows. At first, when the Vt reaches the above hysteresis color changing area, it is decided whether the car speed Vt is increasing or decreasing in step S12. If the car speed Vt is increasing in the area, a speed increasing map is applied thereto in step S13. Then, the fixed emitted light color before color change is selected by a correlation between the car speed and the emitted light color in the speed increasing map in step S14, thereby outgoing as an indicational signal in step S15.

If the car speed Vt is decreasing in step S12, a speed decreasing map is selected in step S16. Then, the fixed emitted light color after color changing is selected by a correlation between the car speed and the emitted light color in the speed decreasing map in step S17, thereby outgoing as an indicational signal in step S15.

In this case, the kind and number of the changing light color can be properly set. Moreover, it is possible to appropriately set concrete values and numbers for the color changing reference value VB, and values for the first set value VH and second set value VL, too. The set values VH, VL are critical values of the hysteresis color changing area and actual control values of the color change, as stated above. That is to say, by further providing the above reference value input circuit 27 on the control means 2c, it is possible to change the reference value VB, and the set values VH, VL.

This vehicle display device changes the emitted light color of the car speed displayed by numerical value in accordance with the car speed. So, the driver sees around the car speed display and can recognize the vehicle state at once by the color change of the indicated color by a peripheral vision or the like. Namely, the driver can immediately recognize which level the real car speed is, whether the car speed is in a zone requiring caution, or in a dangerous zone, and the like. In addition, the emitted light color of indication changes in the hysteretic manner. Therefore, it is possible to moderate a frequent color change of the indicated color, in case the car speed Vt changes around the color changing reference value. Namely, it is possible to display the vehicle speed by the changing color without flicker.

Though all the vehicle display devices of the above first to third embodiments display the car speed, they may display the engine rotating speed as another variable concerning the vehicle state to be indicated. The tachometer gauges such engine rotating speed of the vehicle. In this case, the "car speed" in the first to third embodiment is replaced with the "engine rotating speed" detected by an intermittent signal at a primary winding of an ignition coil or the like. In this way, the inventive device can be embodied into the tachometer as it is instead of the speedometer. Besides, the inventive device can be applied to displays of the other variables such as remaining fuel, water temperature, battery voltage, and engine oil pressure.

As mentioned above, many segments are used to form the bar graph display (zone display) and the number display as a concrete mode of indication in the vehicle display devices of the first to third embodiments. Therein, a specific segment is selectively lit among many segments. However, such a concrete form of indication may be a single light emitting surface as described in the next embodiment.

Figure 13:
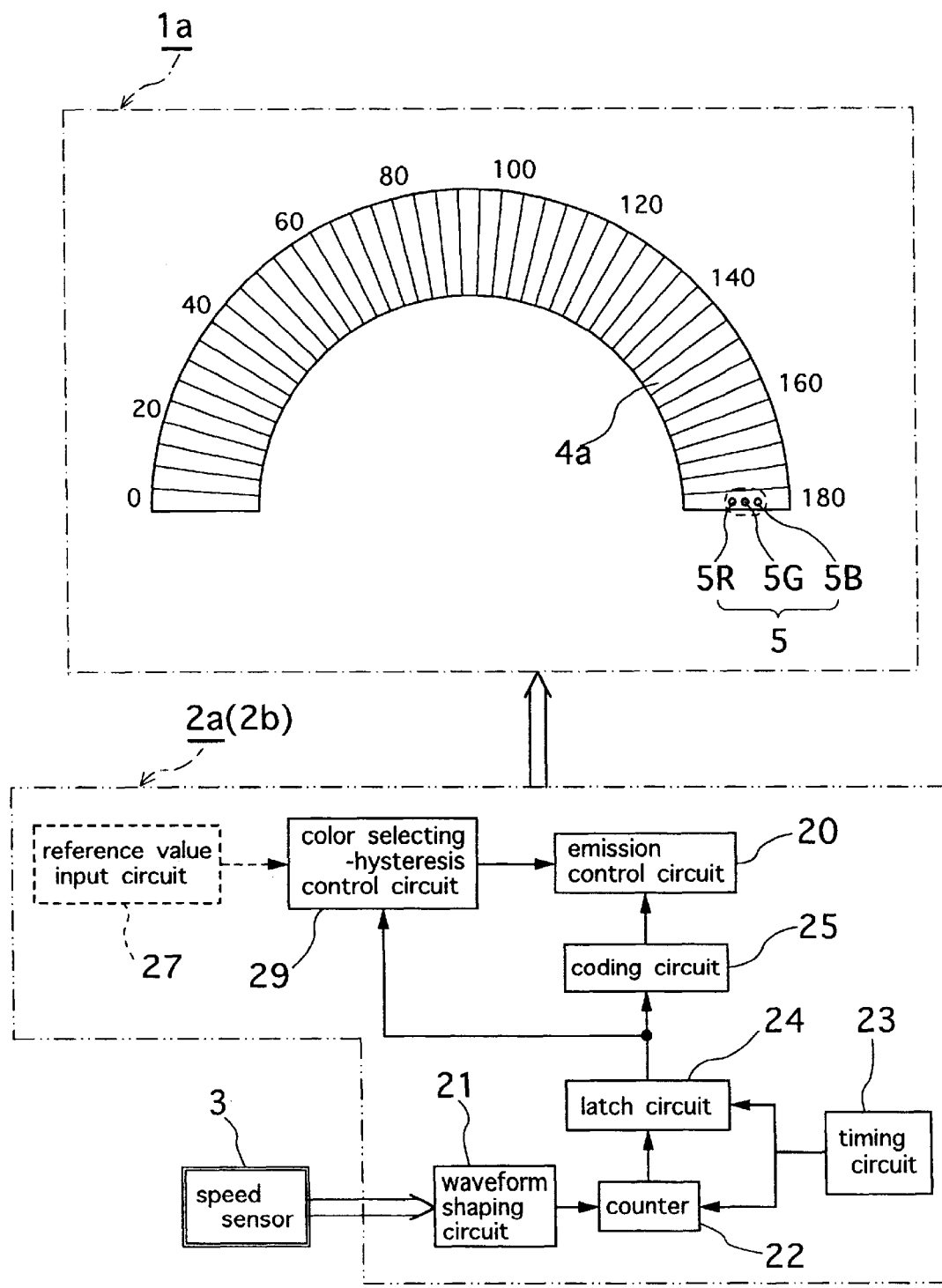
FIG. 13 is an explanatory view showing the construction of a modification in the vehicle display device of the first or second embodiment of this invention.
Figure 14:
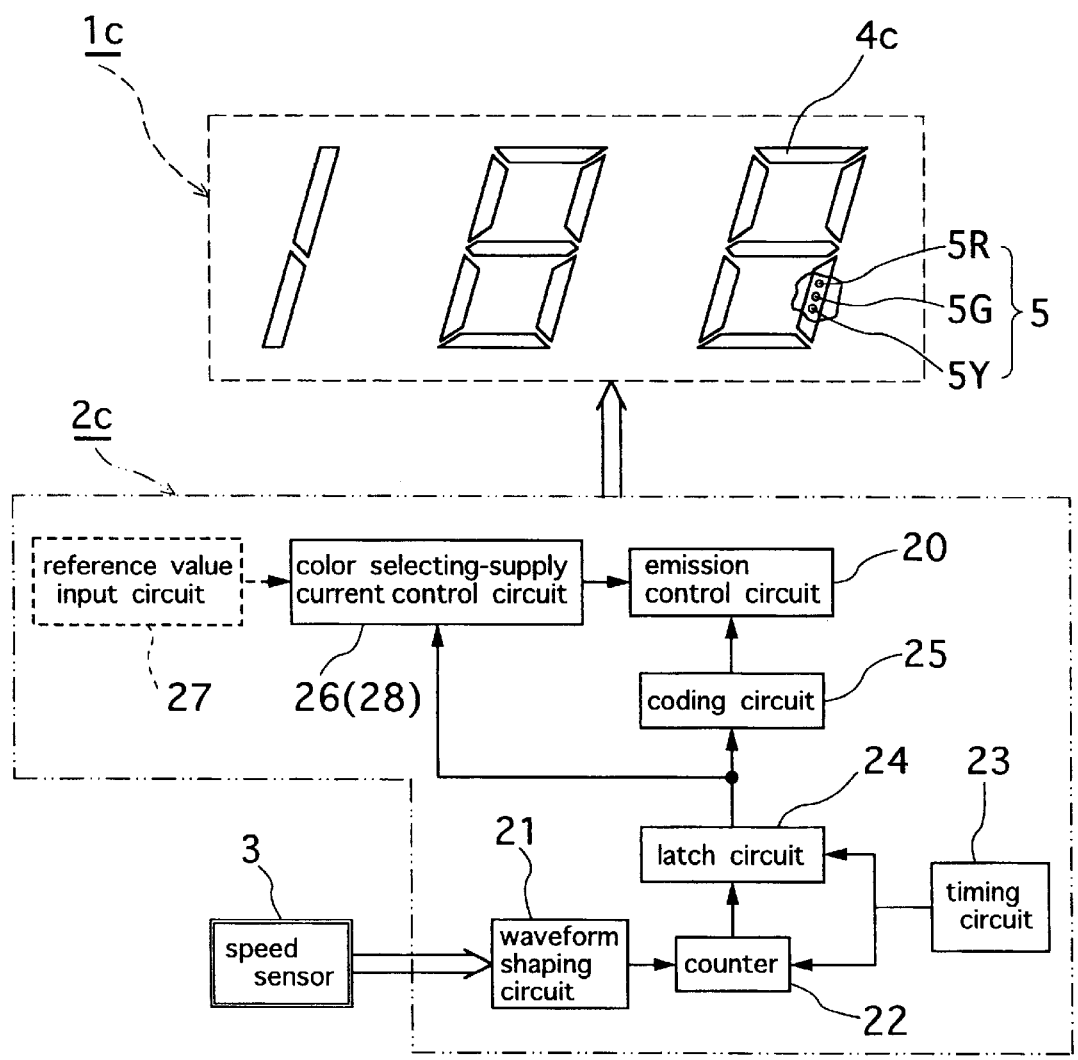
FIG. 14 is an explanatory view showing the construction of a modification in the vehicle display device of the third embodiment of this invention.

As shown in FIG. 13, the color selecting-hysteresis control circuit 29 of the third embodiment may be used instead of the control circuit 26, 28 in the first and second embodiments. In this case, the control circuit 29 controls the change of the emitted light color displayed by bar graph or zone graph in the set value range in the hysteretic manner. To the contrary, the third embodiment may replace the control circuit 29 with the circuits 26, 28 of the above first and second embodiments as shown in FIG. 14. In this case, it is possible to control the emitted light color of the digital display to gradually change in the above set value range middle mixed color.

Fourth embodiment

Figure 15:
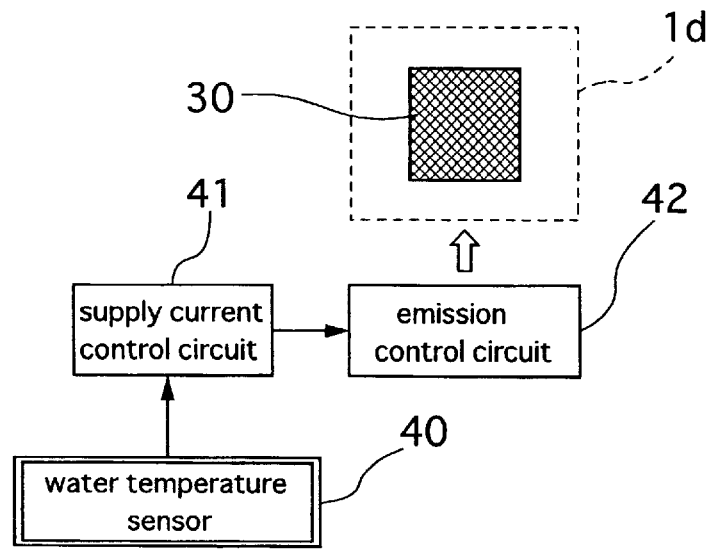
FIG. 15 is an explanatory view showing the construction of a vehicle display device of a fourth embodiment of this invention.
Figure 16:
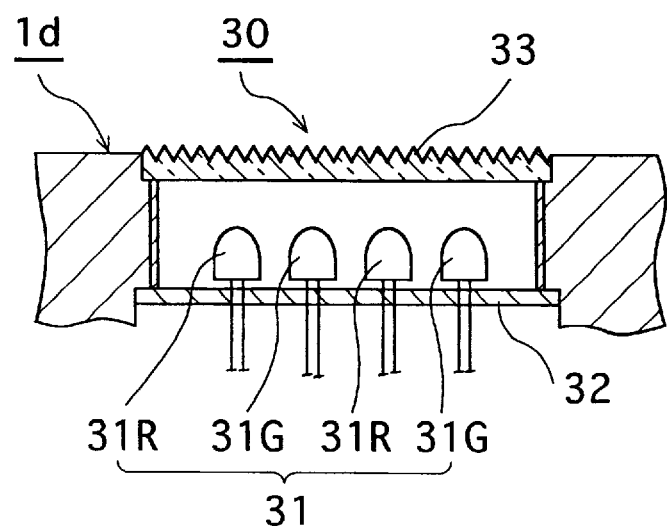
FIG. 16 is a sectional view showing the structure of an indicator in the vehicle display device of the fourth embodiment in this invention.
Figure 17:
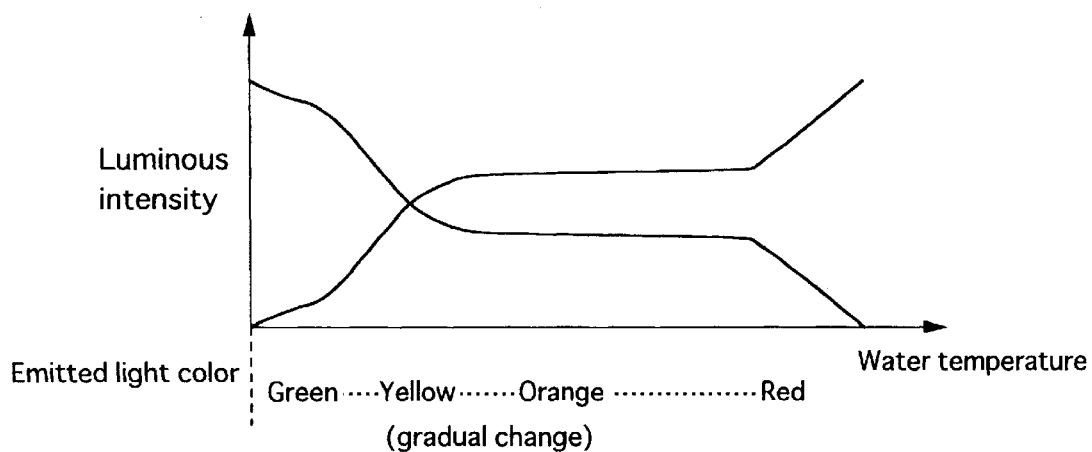
FIG. 17 is an explanatory view showing one example of an illuminated color change in the of the fourth embodiment of this invention.

FIGS. 15–17 concern a vehicle display device of a fourth embodiment of this invention. FIG. 15 is an explanatory view showing the construction of the vehicle display device. FIG. 16 is a sectional view showing the structure of an indicator in the vehicle display device. FIG. 17 is an explanatory view showing one example of an illuminated color change in the vehicle display device.

As shown in FIG. 15, the vehicle display device of the fourth embodiment is embodied as a temperature gauge displaying a temperature of an engine cooling water of a vehicle in an emitted light color. In addition. It comprises an indicator 1d having one emission surface 30 of substantially a rectangular shape, and an indicator control means. The indicator control means controls the emitted light color of the indicator 1d (emission surface 30) to change based on a signal from a water temperature sensor 40, while including a supply current control circuit 41 and an emission control circuit 42.

In detail, the indicator 1d includes red LEDs 31R and green LEDs 31G of a lamp form which are attached to a circuit board 32 in suitable numbers, as shown in FIG. 15. The LEDs 31R and 31G are disposed in an inside space formed at the indicator 1d. A cover 33 is put on an opening of the space, thereby defining the emission surface 30. Such surface 30 may be constructed into a proper shape of a proper size such as a circle, an ellipse, or the like instead of the rectangular shape. Further, the LED 31 of the lamp shape may be provided with not less than two colors of LED chips to be a multi-color lamp or full color lamp. Besides, the LED may be a chip shape like the first to third embodiments.

The supply current control circuit 41 controls the emitted light color of the indicator 1d (emission surface 30) by controlling a current supplied to each LED 31R, 31G. Although the emitted light color itself is similar to that of the first or second embodiment (FIG. 3), the color changing mode is little different from those of the first and second embodiments. Namely, as shown in FIG. 17, the emitted light color of indication changes in a fixed set value range determined based on a fixed color changing reference value, according to the temperature of the engine cooling water. In detail, a brightness of the green LED 31G is decreased step by step, while a brightness of the red LED 31R is increased step by step. Thus, the emitted light color orderly changes from green to red through middle mixed colors, i.e., yellow green, yellow and orange step by step while keeping a constant total brightness in substance. The fixed set value range forms a gradual color changing area on the basis of the color changing reference value. Moreover, it has a wide range between a lower limit and an upper limit which respectively correspond to the substantial lowest value and the substantial highest value of the temperature of the engine cooling water. As for this device, it is impossible to practically specify the color changing reference value concerning the water temperature. A correlation between a value of a brightness change of the emitted light color and a value of the water temperature is not shown by a linear function, as indicated in the FIG. 17. The emitted light color of indication is kept in orange in a proper range as the temperature of the engine cooling water. Accordingly, such change of the emitted light color of indication enables the driver to easily recognize whether the water temperature is in a proper zone, in a low zone, and in a too high zone.

The above case is an example in which a single color changing reference value is used in changing the emitted light color. However, the inventive device may set color changing reference values respectively at an upper limit value and a lower limit value in a range suitable as the water temperature, for example. In this modification, the emitted light color of indication can respectively vary among three colors while becoming middle mixed colors thereof at respective gradual color changing areas.

In the above embodiment, a wide range of the gradual color changing area is set as the fixed set value range determined based on the color changing reference value. Similarly, it is possible to apply such a wide range of the gradual color changing area to the first to third embodiments.

As explained above, the current supplied to each LED, thereby gradually changing the emitted light color. Concretely, the circuit 41 may be replaced with the color selecting-duty control circuit 26 in the first embodiment, or the color selecting-supply current control circuit 28 in the second embodiment. Besides, it is general to provide a thermistor on the water temperature sensor 40, so that it is preferable that such circuit 41 is an analog control circuit. A conventional one may be applied to the analog control circuit. For instance, it is possible to use a control circuit of Japanese Laid Open Patent Publication No. 60-164371 suggested by TOYODA GOSEI CO., LTD which is an assignee of this application.

In this way, the vehicle display device of the fourth embodiment is constructed of the indicator control means comprising the control circuits 41, 42, though not clearly showing the color changing reference value. Namely, the emitted light color of indication changes according to a value of the temperature of the engine cooling water in this vehicle display device. Therefore, the driver can know the state of the water temperature and a warning from the change of the emitted light color. The change of the emitted light color is graduated via the middle mixed colors of the light color before color change and the light color after color change in the gradual color changing area. Therefore, it is possible to moderate a frequent rapid color change, in case the value of the water temperature varies around the color changing reference value. Namely, it is possible to change the emitted light color of indication without flicker.

The fourth embodiment controls the current supplied to the LED to prevent or deter the flicker when changing the emitted light color of the indicator 1d. However, the emitted light color may be varied in a hysteretic manner like the third embodiment.

Figure 18:
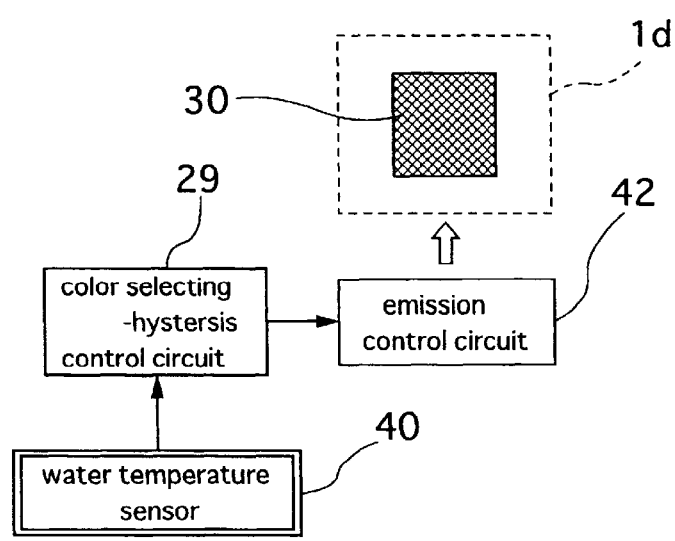
FIG. 18 is an explanatory view showing a modification of the vehicle display device of the vehicle display device of the fourth embodiment of this invention.

In this modification, the vehicle display device of the fourth embodiment comprises an indicator control means changing the emitted light color in the hysteretic manner. Concretely, the indicator control means controls the lighting of the LED 31, thereby making the emitted light color of indication change according to the value of the water temperature around the fixed color changing reference value. At this time, it continues the lighting of the emitted light color before color change when the value of the water temperature changes in the fixed set value range determined on the basis of the color changing reference value. Thus, the hysteretic color changing operation is conducted. As shown in FIG. 18, such indicator control means can be constructed of the color selecting-hysteresis control circuit 29 of the third embodiment (FIG. 9), instead of the supply current control circuit 41. In addition, in case such control circuit 29 is an analog circuit, it is possible to use a Schmitt circuit, for example.

The inventive device of the fourth embodiment or the above modifications display the temperature of the engine cooling water. However, its system can be applied to a device for displaying other variables concerning the vehicle state such as a car speed, engine rotating speed, remaining fuel, battery voltage, engine oil pressure. In this case, their values can be represented by the change of the emitted light color without flicker too.

Fifth embodiment

A fifth embodiment of this invention will be described hereafter.

Figure 19:
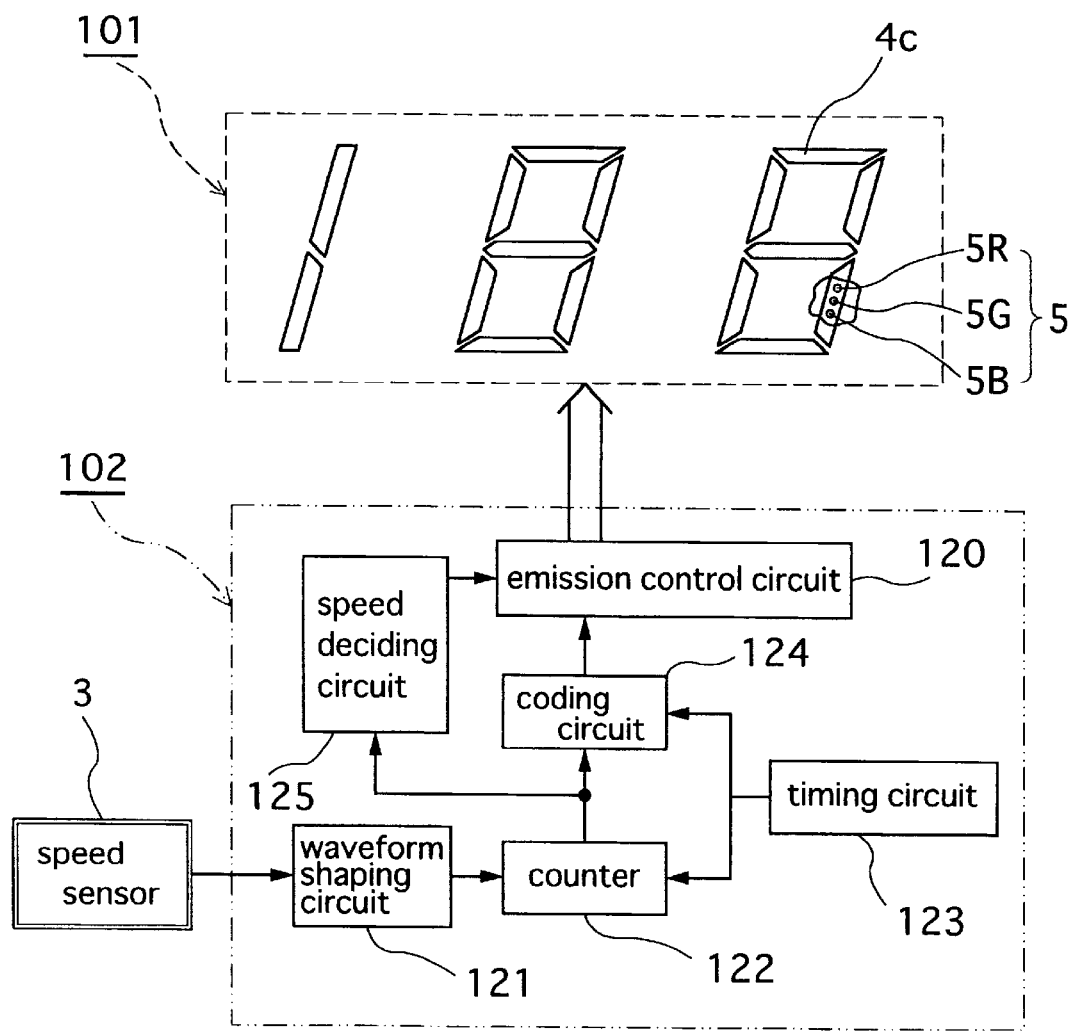
FIG. 19 is an explanatory view showing the construction of a digital meter as a vehicle display device of a fifth embodiment of this invention.
Figure 20:
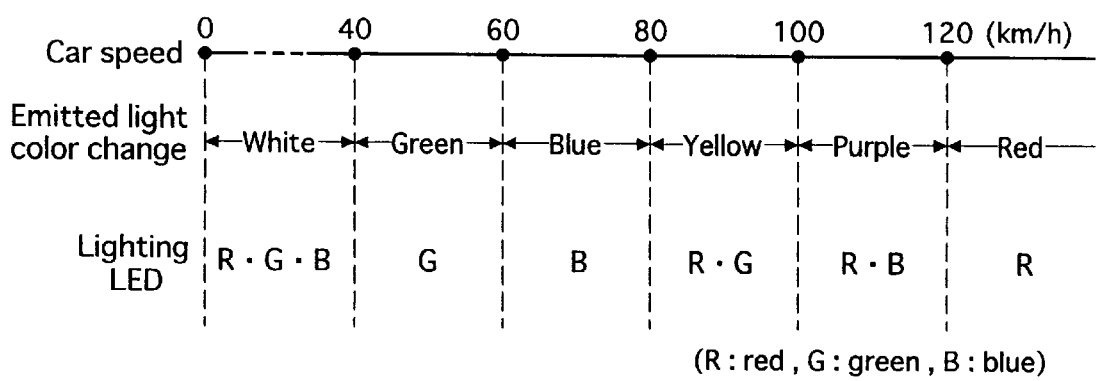
FIG. 20 is an explanatory view showing one example of color change of an indicator in the digital meter of the fifth embodiment of this invention.
Figure 21:
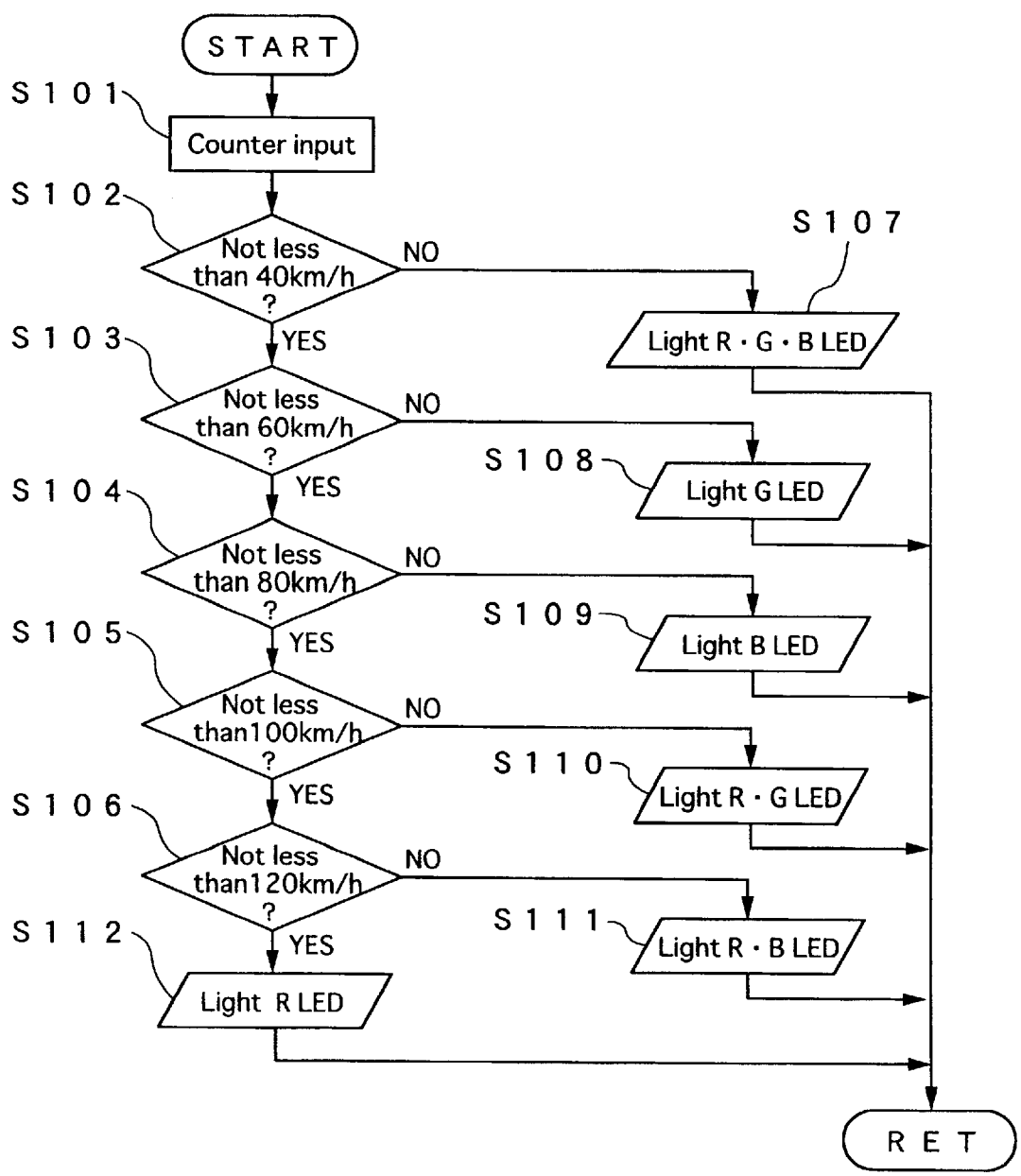
FIG. 21 is a flowchart showing the control program of a speed deciding circuit of the digital meter of the fifth embodiment of this invention.

FIG. 19 is an explanatory view showing the construction of a digital meter as a vehicle display device of a fifth embodiment of this invention. FIG. 20 is an explanatory view showing one example of color change of an indicator in the digital meter of FIG. 19. FIG. 21 is a flowchart showing the control program of a speed deciding circuit of the digital meter of the fifth embodiment of this invention.

As shown in FIG. 19, the vehicle display device of the fifth embodiment is embodied in a digital speedometer of an electronic type. The speedometer comprises an indicator 101 of a digital type showing the car speed as a real number and an indicator control means 102, similarly to the third embodiment. The indicator control means 102 controls the indicator 101 to display the car speed so that the speed value computed on the basis of the signal from the speed sensor 3 is displayed by number.

The indicator 101 is made up as an LED display and installed in a proper part of a vehicle instrument panel, a center cluster or the like by itself, and installed with another gauge and display device, just as the indicator 1c of the third embodiment. In addition, the specific segment 4c is illuminated by the lighting of the LED 5 to display respective numbers from "0" to "9", similarly to the indicator 1c of the third embodiment.

In this embodiment, each segment 4c is respectively provided with the red LED 5R, green LED 5G, and blue LED 5B which are three primary colors of light. Accordingly, it is possible to get total seven colors of the emitted rays by selectively lighting such three colors of LEDs 5R, 5G, 5B. Namely, the indicator 101 made of the segments 4c has not only red, green, blue, but also yellow and purple which are mixed colors of two of the LEDs, and white which is a mixed color of all three colors. The above LEDs 5R, 5G, 5B of three colors form a color changing LED radiating different hues of rays from each other, respectively. The color changing LED comprises a light emission means which illuminates at least one of the segment 4c and a vicinity of the indicator 101.

The indicator control means 102 controls the emitted light of such segments 4c to display the car speed in numerical value. Namely, the car speed is obtained by computing the signal from the speed sensor 3, and the means 102 controls lighting of the LEDs 5R, 5G, 5B placed at a fixed segment 4c based on a value of the car speed. Therefore, the control means 102 has an emission control circuit 120 controlling the lighting of the segments 4c which are necessary for displaying the car speed in number.

Particularly, a detected signal (pulse) from the speed sensor 3 such as a photoelectric sensor is input into a counter 122 via a waveform shaping circuit 121, as shown in FIG. 19. Thereafter, a timing circuit 123 counts the pulses between an opening gate time and a closing gate time (0.3 sec.), and the count data from a car speed value data is compared with stored data. Only if their difference is not less than 1 km/h, is the count data sent to the emission control circuit 120, thereby renewing the car speed value which was displayed until then. On the other hand, the above count data is coded at a coding circuit 124, and the new code is retained till the next timing of the timing circuit 123. The timing circuit 123 clears the previous data in the counter 122. In this way, a counting operation is repeated. The control means 102 computes the car speed and makes its car speed value displayed on the indicator 101.

The control means 102 selects one LED or combined LEDs to be lit among the red LED 5R, green LED 5G and blue LED 5B which are provided on each segment 4c, according to the car speed. Thus, it changes an emitted light color of a lighting number for indicating the car speed value in order corresponding to the car speed by means of hardware. In detail, the control means 102 is constituted of a speed deciding circuit 125 having a computing circuit. The count data from the car speed value data is sent to the circuit 125. The speed deciding circuit 125 compares the count data with a previously set reference value (a color changing reference value), thereby deciding a level of the car speed. Thereafter, the deciding circuit 125 chooses one LED or the combined LEDs to be lit among the three LEDs based on the decided data. That is, the speed deciding circuit 125 works as a color selecting circuit selecting a light color, which is the single color or the combined color of the LEDs 5R, 5G, 5B, according to the car speed.

Next, the color changing operation of such emitted light color is described referring to the FIG. 20, for example. The speed deciding circuit 125 performs its control operation in accordance with the flowchart of the FIG. 21.

In FIG. 21, the signal (car speed data value) from the counter 122 is input into the speed deciding circuit 125 in step S101. Then, it is decided whether the data value is not less than "40 km/h" in step S102. If it is below "40 km/h", the emitted light color becomes white by simultaneously lighting the red LED 5R, green LED 5G and blue LED 5B, which are the three primary colors of light, in step S107. Otherwise, it is respectively decided if the data value is not less than "60 km/h", "80 km/h", "100 km/h" and "120 km/h" which are comparing reference values in steps S103 to S106. Then, the speed deciding circuit 125 makes a selected LED or LEDs to emit light corresponding to the car speed within the above speed range in step S107 to step S112.

Concretely, as shown in FIG. 20, the current car speed is compared with six levels of comparing reference values: "40 km/h", "60 km/h", "80 km/h", "100 km/h" and "120 km/h". The circuit 125 orderly changes the emitting light color of the lighting number for indicating the car speed value, according to each level. Namely, the white emitted light is emitted to display the lighting number, if the car speed is in a first level from 0 to 40 km/h. The emitted light color of the lighting number orderly changes from green to blue, yellow, and purple in every 20 km/h. When exceeding 120 km/h or more at a sixth level, the car speed value is numerically displayed in red. The above operation is only an example, and it is possible to set the comparing reference value (color changing critical car speed value) and the changing emitted light color as desired. Further, it is possible to make the color change of the lighting number in the daytime different from that in the nighttime. As for the change of the emitted light color, it is possible to gradually change an emitted light color before color change and an emitted light color after color change through a middle mixed color, as another modification in FIG. 27 which will be described later.

In this way, such a vehicle digital meter device sequentially changes the emitted light color of the lighting number to display the car speed in many colors in accordance with the car speed. Therefore, a driver can easily recognize at which level the car speed is, without reading the displayed number, if he or she merely see the emitted light color of the indicator 101 or see around it. Thus, it is possible to more facilitate reading the car speed value displayed in number.

As a result, the inventive device is effective to secure higher safety when a car is running.

In this kind of embodiment, it is preferable to have a lot of color changes for the emitted light color of the numerical indication, because the driver can more accurately grasp at which level the car speed is. So, it is desirable to use the LED including red, green and blue, which are the three primary colors of light, as in the above embodiment. Such three LEDs can produce a white light whose visibility is good. Therefore, the driver can get a good visibility off the numerical indicator, if white is set as the emitted light color of indication at a safety running speed level. Of course, two colors of LEDs may be used as long as they have hues different from each other. In this case, even if the LED has only two colors, it is possible to obtain not only respective two colors but also the mixed color by simultaneously lighting both of them, and to change the emitted light color by three colors.

Sixth embodiment

Figure 22:
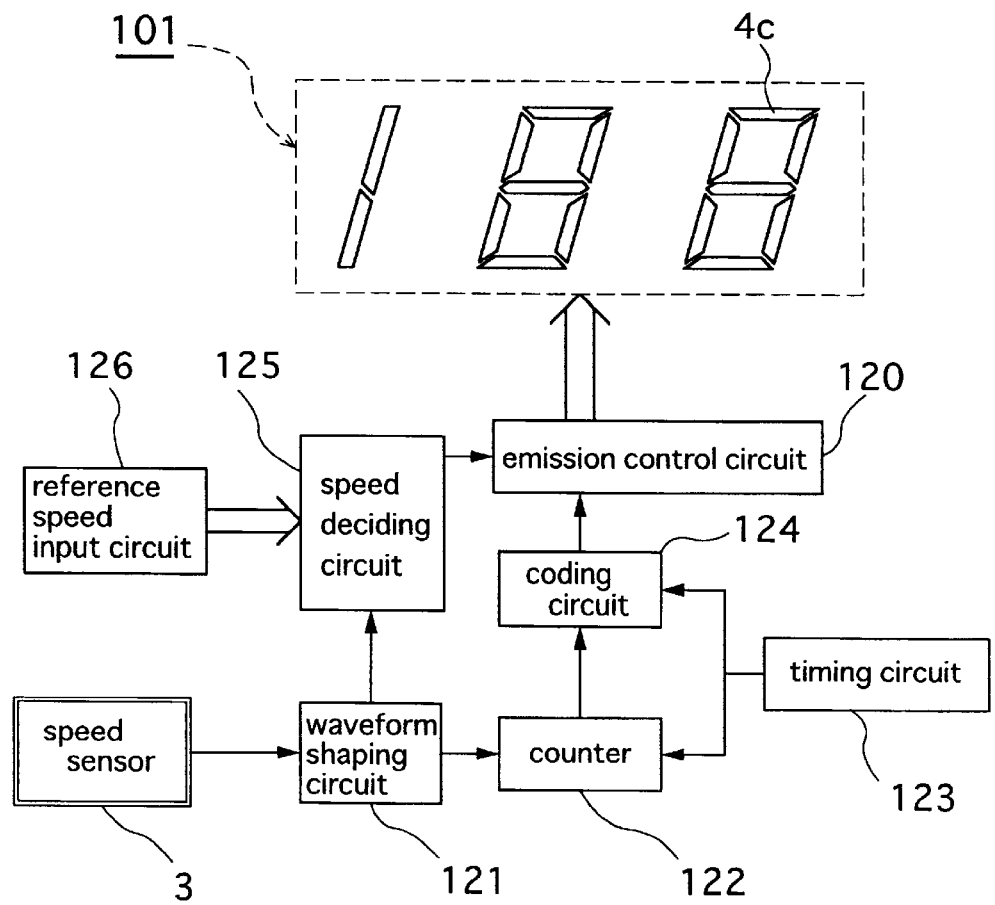
FIG. 22 is an explanatory view showing the construction of a digital meter as a vehicle display device of a sixth embodiment of this invention.
Figure 23:
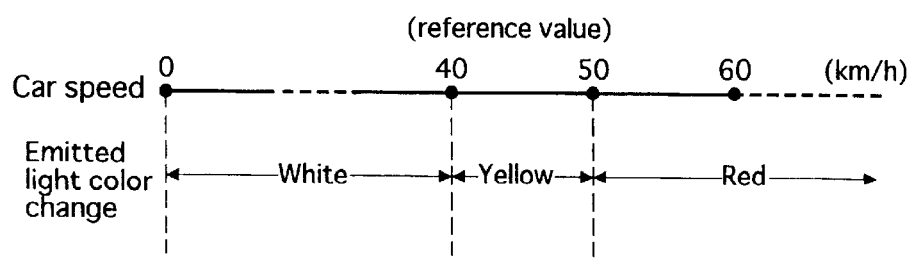
FIG. 23 is an explanatory view showing one example of color change of an indicator in the digital meter of the sixth embodiment of this invention.
Figure 24:
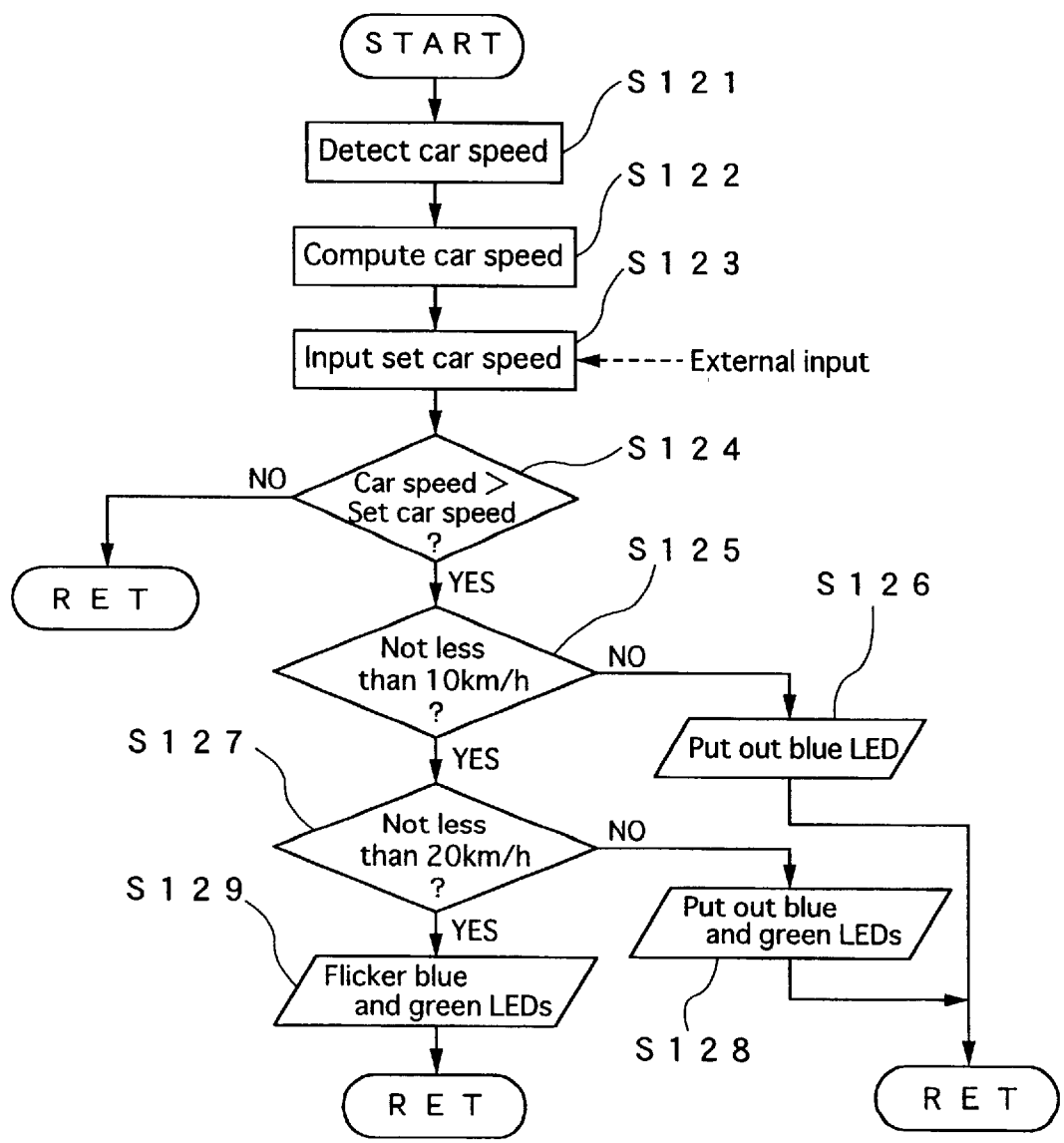
FIG. 24 is a flowchart showing the control program of a speed deciding circuit of the digital meter embodiment of this invention.

FIG. 22 is an explanatory view showing a construction of a digital meter as a vehicle display device of a sixth embodiment of this invention. FIG. 23 is an explanatory view showing one example of color change of an indication in the digital meter of FIG. 22. FIG. 24 is a flowchart showing the control program of a speed deciding circuit of the digital meter in the sixth embodiment of this invention.

A safe car speed depends on the condition of the road on which a car is running or the like. Therefore, a proper speed limit is commonly set according to the condition of the road or the like. The vehicle digital meter of the sixth embodiment displays the car speed just as the fifth embodiment. However, this embodiment can make a driver easily recognize what the car speed is, especially in relation to the speed limit of the road.

Namely, as shown in FIG. 22, the sixth embodiment further provides a reference speed input circuit 126 as input to the speed deciding circuit 125 of the color selecting circuit of the vehicle digital meter of the fifth embodiment. As a result, this embodiment can change a speed reference value (a color changing reference value) with which the current car speed is compared. Such speed reference value can be a speed limit which the driver optionally sets. In addition, it can be set by information obtained by graphic recognition of the vehicle speed limit indicated by a road sign or traffic sign or the like, or by a traffic information such as a VICS (vehicle information communication system).

This embodiment is comprised of plural speed reference values which have speed differences previously set and which are varied at the same time by the reference speed input circuit 126. Though not shown in FIG. 22, it uses a red LED 5R, a green LED 5G and a blue LED 5B which are respectively provided on each segment 4c. As shown in FIG. 23, a fixed control circuit selects an emitted light color from respective single colors and combined colors made from the LEDs 5R, 5G, 5B on each segment 4c, according to the car speed. Thus, it changes the emitted light color of the number of the car speed value in order corresponding to the car speed by means of hardware. Further, it is set such that the three kinds of LEDs 5R, 5G, 5B concurrently emit light, as long as a specific LED among them is not controlled to be put out.

A control operation of the speed deciding circuit 125 is conducted in accordance with the flowchart of FIG. 24.

In FIG. 24, an output of the speed sensor 3 is detected through the waveform shaping circuit 121 in step S121, and the car speed is computed in step S122. Then, the circuit 126 inputs a set car speed as an external input, i.e., the speed reference value in step S123.

Thereafter, it is decided whether a current car speed exceeds such set car speed in step S124. If it is decided that the current speed is not more than the set speed value in step S124, the execution exits this routine. Then, the lighting number is displayed in white by simultaneous lighting the LEDs 5Rt 5G, 5B. If it is decided that the current speed is over the set speed value in step S124, the circuit 125 decides whether its exceeded amount is not less than 10 km/h. When it is decided that the amount is below 10 km/h in step S125, the blue LED 5B is put out in step S126. Then, the emitted light color of the lighting number is changed from white to yellow. If it is decided that the exceeded amount is not less than 10 km/h in step S125, the circuit 125 decides whether the amount is not less than 20 km/h in step S127. When it is decided that the amount is below 20 km/h, the blue LED 5B and green LED 5G are put out in step S128. Then, the emitted light color of the lighting number is changed from yellow to red. Moreover, if it is decided that the exceeded amount is not less than 20 km/h in step S127, the LEDs 5B, 5G are flickered in step S129. Then, the emitted light color of the lighting number is flickered in red and white by turns.

In detail, the speed reference values have three reference values a speed difference between which is 10 km/h, as shown in FIG. 23. That is, this embodiment defines a first speed reference value at which the car speed firstly changes the emitted light color of indication. Similarly, it defines a second speed reference value which is faster than the first value by 10 km/h, and a third speed reference value which is faster than the first value by 20 km/h. That is, the first speed reference value is set at "40 km/h" corresponding to a speed limit of "40 km/h" on the road. At this time, the emitted light color of indication is white unless the car speed is over "40 km/h". The light color changes to yellow showing "beware" when the car speed exceeds "40 km/h". The light color changings to red showing "danger" if the car speed is more than "50 km/h". When the car speed is over "60 km/h", the emitted light color is flickered in red. Such speed reference value can be varied by the reference speed input circuit 126, as mentioned above. For example, it is possible to set the first speed reference value at "60 km/h" where the speed limit of the road is "60 km/h". At this time, the emitted light color of indication orderly changes from white to yellow when the car speed is over "60 km/h". Then, the emitted light color changes to red in case the car speed is over "70 km/h". Thereafter, the emitted light color is flickered in red when the car speed exceeds "80 km/h".

While three speed reference values are set in this embodiment, only one reference value may be set. In this case, the emitted light color is changed only once when the car speed exceeds the speed reference value. Moreover, more than three reference values may be set so that the emitted light color is changed more than three times. Further, the speed reference value may be input or changed by the input circuit 126 via a manual operation by an adjusting knob or the like, so as to satisfy needs of a driver and so on. If a traffic information communication system is constructed in future, a speed reference value data may be automatically or the like equipped on running, e.g.

In the digital meter of the sixth embodiment, the speed limit of the road can be input as the reference value through the input circuit 126, for instance. Thus, a driver can easily recognize whether the car speed exceeds the speed limit and to what extent the car speed is over the limit, if he or she merely sees the emitted light color of the indicator 101 or sees around it. Accordingly, the inventive device is effective to secure higher safety when a car is running.

Seventh embodiment

As mentioned above, the fifth embodiment changes the emitted light color of the numerical indicator itself according to the car speed in each vehicle display device. However, this seventh embodiment changes it in an area surrounding the indicating number and is seen with the number, not at the numerical indication itself. In this case, it is possible to obtain the same effect as in the above two embodiments.

Figure 25:
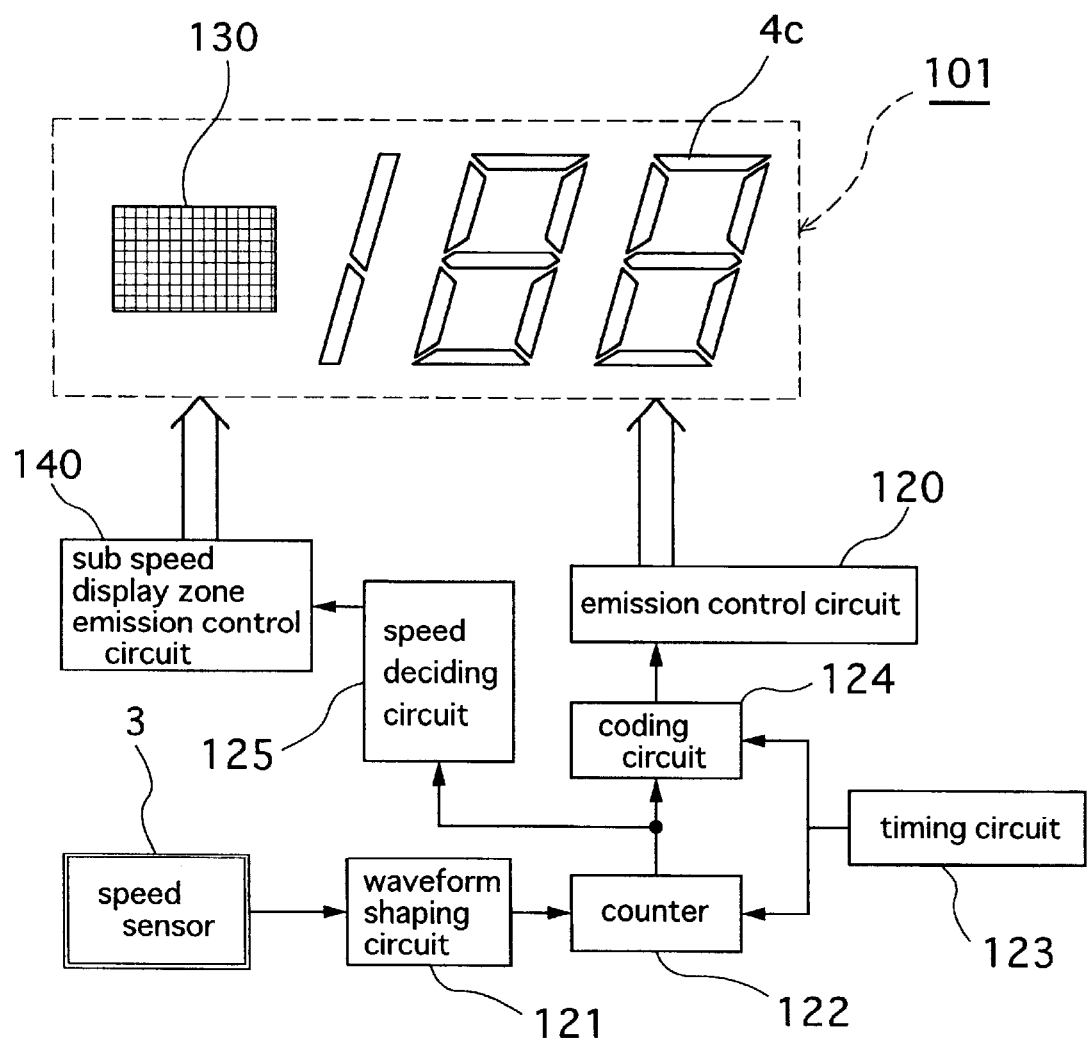
FIG. 25 is an explanatory view schematically showing the construction of a digital meter as a vehicle display device of a seventh embodiment of this invention.
Figure 26:
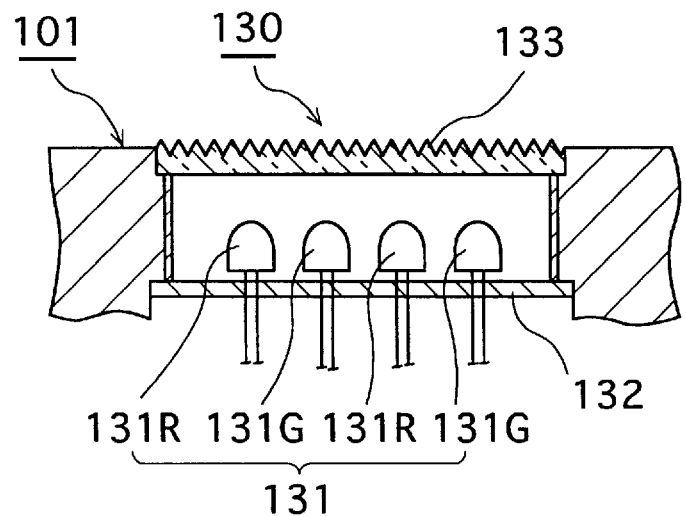
FIG. 26 is a sectional view showing the structure of a sub speed display zone in the digital meter of the seventh embodiment of this invention.
Figure 27:
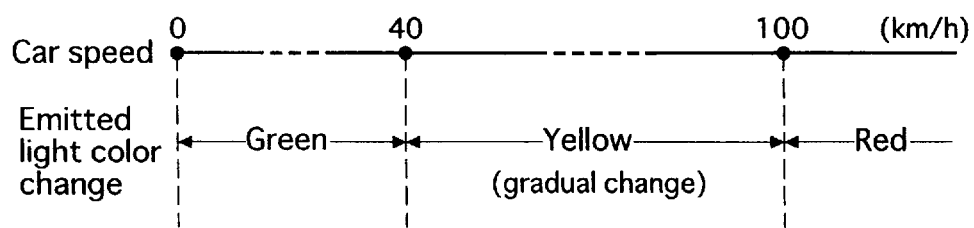
FIG. 27 is an explanatory view showing one example of color change of an indicator in the vehicle digital meter of the seventh embodiment of this invention.

FIG. 25 is an explanatory view schematically showing the construction of a digital meter as a vehicle display device of a seventh embodiment of this invention. FIG. 26 is a sectional view showing a structure of a sub-speed display zone in the digital meter of the FIG. 25. FIG. 27 is an explanatory view showing one example of color change of an emitted light color in the vehicle digital meter of FIG. 25.

In FIG. 25, the same marks as that of the vehicle digital meter device of the fifth, sixth embodiment in respective FIGS. 19, 22, indicate same or corresponding parts as their components. The device of the seventh embodiment provides a sub-speed display zone 130 on the indicator 101 displaying the car speed by number. In the sub-speed display zone 130, the emitted light color changes according to the car speed similarly to the fifth or sixth embodiment, so that the car speed can be understood more easily. Therefore, only one LED is disposed on each segment 4c. Otherwise, even if two or more colors of LEDs are provided, an indicating number itself is illuminated without changing the emitted light color according to the car speed.

Such zone 130 is placed at a suitable position sufficiently adjacent to the seven segments 4c forming the indicating number and within an area at which the zone 130 is not confused with other indications. Moreover, it is formed in such a size as to get enough visibility within the above area. In this embodiment, the zone 130 is disposed on a left side of the speed indicator as an emitted light zone of a rectangular shape. In detail, the sub-speed display zone 130 includes one or more red LED 131 R and green LED 131G of a lamp shape which are attached to a circuit board 132 in suitable numbers as shown in FIG. 26. The LEDs 131R, 131G are disposed in an inside space formed in the indicator 101 together with the circuit board 132. A cover 133 is put on a front side opening of the inside space. Thus, the zone 130 is illuminated in red, green, and yellow which is their mixed color by selectively lighting the red LED 131R and green LED 131G. The above LEDs 131R and 131G form two kinds of color changing LEDs radiating different hues of rays from each other, respectively. The color changing LED constitutes an light emitting means which illuminates at least one of the segment 4c and a vicinity of the indicator 101. In this case, the light emitting means further includes an LED placed on each segment 4c as an indicating number LED which lights each segment in a desired emitted light color. The zone 130 can emit light of not less than two colors of hues with the color changing LEDs placed around the segments.

This digital meter device comprises an indicator control means controlling the number indicator of the car speed which is formed by the 7-segment arrangement. The control means has the waveform shaping circuit 121, counter 122, timing circuit 123, coding circuit 124, and emission control circuit 120 as in the fifth or sixth embodiment. It controls the lighting of the LED provided on each segment 4c, thereby having a specific segment 4c selectively lit among many segments 4c. Consequently, the control means makes the indicator 101 numerically display the speed value computed based on the signal from the speed sensor 3.

The zone 130 has its emitted light color orderly changed via two colors of LEDs 131R and 131G according to the car speed on the basis of a color changing reference value corresponding to a predetermined value of a variable. Namely, in this embodiment, the speed deciding circuit 125 works as a color selecting circuit which decides the car speed value (count data) to select the color of the LED 131 to be lit at the zone 130 based on the decided data. Namely, such data is sent to a sub-speed display zone emission control circuit 140. Then, the control circuit 140 selectively turns on the red LED 131R and the green LED 131G. Then, the emitted light color changes in order according to the car speed. A sub-display zone emission control means is comprised of the above circuits. It may further include the reference speed input circuit 126 therein as shown in the sixth embodiment. The indicator control means includes the zone emission control means and decides a value of the variable and selects the color to be lit of the color changing LED according to the decided value of the variable. Namely, it controls the numerical indication and the emitted light color of the zone 130 to orderly change into not less than two colors according to the value of the variable.

FIG. 27 shows one example in which the emitted light color of the sub-speed display zone 130 is changed according to the car speed. As shown in FIG. 27, the car speed is divided in three levels by "40 km/h" and "100 km/h" as reference speeds. In this way, the emitted light color of the zone 130 is sequently changed from green to red via yellow according to the car speed. Concretely, only the LED 131G illuminates the sub-speed display zone 130 in green in case the car speed is below "40 km/h". On the other hand, only the LED 131R illuminates the zone 130 in red in case the car speed exceeds "100 km/h". When the car speed is between "40 km/h" and "100 km/h", the LEDs 131R, 131G emits their mixed color. At this time, the mixed color is gradually changed between green and red in accordance with the car speed as mentioned above. Therefore, it is possible to moderate a frequent color change, in case the car speed changes around "40 km/h" or "100 km/h". Namely, it is possible to display the vehicle speed by the changing color without can flicker. Here, the emitted light color of indication can be gradually varied by a gradual change of a number of the LEDs 131R, 131G to be lit, or by a gradual change of a current supplied to each LED 131R, 131G.

As mentioned above, the vehicle digital meter of this seventh embodiment comprises the circuit 125 and the control means 140 controlling the lighting of the zone 130 to orderly change the lighting of the zone 130 in not less than three colors according to the car speed.

In other words, this vehicle digital meter device includes the zone 130 having two LEDs disposed around the position of many segments 4c for the car speed indication. Moreover, the zone 130 gradually changes the emitted light color in order. Therefore, a driver can easily recognize at which level the car speed is from the indicated color, if he or she merely sees the emitted light color of the indicator 101, or sees around it by a peripheral vision. Thus, it is possible to improve the legibility of the car speed value displayed by number. Consequently, the inventive device is effective to secure higher safety when a car is running.

While, the zone 130 is formed into the rectangular shape of light-emitting area in this embodiment, it may be embodied in other various modes, as long as the numerical indication and the zone 130 both can be seen well. For example, the zone 130 may be modified into a frame shape surrounding the numerical indication or into stripes wholly disposed on a background of the numerical indication. Additionally, it can be modified so as to wholly illuminate the numerical indication from its background. Of course, this zone 130 may be an indication of a character shape such as "km/h" which is a unit of the speed.

Such zone shape needs to have enough visibility as mentioned above, however it concurrently should not lower the legibility of the numerical indication of the car speed in a segment display. From such point of view, it is preferable to gradually change the emitted light color of the sub-speed display zone 130 as shown in FIG. 27. In case of such gradual color change, the emitted light color of indication varies in more colors than non-gradual color change. For example, in the case of changing the emitted light color from green to red, the indicator can become yellow, green, orange and so on in addition to yellow which is a middle mixed color of green and red. Similarly, the above gradually changing operation may be applied to the fifth or sixth embodiment changing the emitted light color of the numerical indication itself.

Moreover, as for the segment arrangement, it is possible to form a 16-segment which can display much more characters than the 7-segment and so on. Furthermore, the segments may be arranged so as to display a temperature or similar data in addition.

All the vehicle display devices of the above fifth to seventh embodiments are embodied into the digital speed meter device displaying the car speed as stated above. However, they may display the engine rotating speed as another variable concerning the vehicle state to be indicated. In such digital tachometer device, the speed sensor in the fifth to seventh embodiment is replaced with an engine rotating speed sensor. Concretely, the engine rotating speed sensor may be a sensor detecting the engine speed by an intermittent signal generated at a primary winding of an ignition coil or the like. Then, an emitted light color of a number displaying the engine rotating speed or an emitted light color of an engine sub-speed display zone is changed according to the engine speed just as the case of the car speed. Therefore, such devices can improve the legibility and recognition of the engine rotating speed displayed by number. Otherwise, it may display a proper engine rotating speed during idling, the best engine rotating speed for fuel consumption efficiency, and the like, with the emitted light color changed.

Similarly, the inventive vehicle digital meter device of the fifth to seventh embodiment can be applied to displays of other variables concerning a vehicle state such as remaining fuel, cooling water temperature, battery voltage, engine oil pressure, etc. However, in the case of such variables, the device needs an A/D conversion circuit in addition, because it has an analog sensor for detecting the variable such as a fuel sender gauge, thermistor, etc. Such variables change substantially within a comparatively narrow range. So, the indicated color change for such variables is useful to indicate whether the value of the variable is best, or too high or too low, and the like, rather than to improve the recognition of the displayed number. Therefore, the reference value of the color change is preferably set according thereto.

The preferred embodiments described herein are therefore illustrative and not restrictive, the scope of the invention being indicated in the appended claims and all variations which come within the meaning of the claims are intended to be embraced therein.

We claim:

1. A vehicle display device comprising:
an indicator displaying a variable concerning a vehicle state;
plural LEDs provided on the indicator and lighting the indicator by two or more colors; and
indicator control means for controlling light emission of the LEDs so as to change an emitted light color of the indicator in accordance with a change of the variable around a color changing reference value corresponding to a fixed value of the variable,
wherein the indicator control means gradually changes the emitted light color of the LED from an emitted light color before a color change to an emitted light color after the color change via a mixed color thereof.

2. A vehicle display device comprising:
an indicator displaying a variable concerning a vehicle state;
plural LEDs provided on the indicator and lighting the indicator by two or more colors; and
indicator control means for controlling light emission of the LEDs;
the indicator control means changing an emitted light color of the indicator in accordance with a change of the variable based on a color changing reference value corresponding to a fixed value of the variable; and
the indicator control means controlling a current supplied to the LEDs in a predetermined set value range determined on the basis of the color changing reference value, when changing the emitted light color, so that brightness of the emitted light color before a color change is gradually decreased while brightness of an emitted light color after the color change is gradually increased.

3. A vehicle display device according to claim 2, wherein:
the indicator is made of a plurality of segments displaying the variable concerning the vehicle state;
The LEDs are disposed on each of the segments and illuminate each of the segments by two or more colors of emitted light; and
the indicator control means controls the light emission of the LEDs to display the variable on the indicator by selectively lighting a specific segment among the segments, while gradually changing the emitted light color of the segment in the set value range.

4. A vehicle display device according to claim 3, wherein:
the indicator control means includes a duty control circuit controlling a duty ratio of a pulse current supplied to the LEDs, and
the duty control circuit gradually decreases the duty ratio of the pulse current supplied to the LEDs emitting the light color before the color change, while gradually increasing the pulse current supplied to the LEDs emitting the light color after the color change in the set value range, when changing the emitted light color.

5. A vehicle display device according to claim 3, wherein:
the indicator control means includes a current control circuit controlling a value of a direct current supplied to the LEDs, and
the current control circuit gradually decreases the value of the current supplied to the LEDs emitting the light color before the color change, while gradually increasing the value of the current supplied to the LEDs emitting light color after the color change.

6. A vehicle display device according to claim 3, wherein the segments of the indicator are arranged in nearly a linear shape extending in a fixed direction so as to consecutively display the variable concerning the vehicle state.

7. A vehicle display device according to claim 3, wherein the segments of the indicator are arranged so as to digitally display the variable concerning the vehicle state.

8. A vehicle display device according to claim 2, wherein:

the indicator includes a single light emission surface displaying the variable concerning the vehicle state by the emitted light color;

the LEDs are disposed on the light emission surface and illuminate the light emission surface by two or more colors of emitted light; and the indicator control means controls the light emission of the LEDs to display the variable on the indicator by lighting the light emission surface, while gradually changing the emitted light color of the light emission surface in the set value range.

9. A vehicle display device comprising:

an indicator displaying a variable concerning a vehicle state;

plural LEDs provided on the indicator and lighting the indicator by two or more colors; and indicator control means for controlling light emission of the LEDs;

the indicator control means changing an emitted light color of the indicator in accordance with a change of the variable based on a color changing reference value corresponding to a fixed value of the variable; and the indicator control means varying the emitted light color of the indicator in a hysteretic manner in a predetermined set value range determined based on the color changing reference value, when changing the emitted light color, so that light emission of a light color before a color change is continued beyond the color changing reference value when the value of the variable increases and decreases.

10. A vehicle display device according to claim 10, wherein:

the indicator is made of a plurality of segments displaying the variable concerning the vehicle state;

the LEDs are disposed on each of the segments and illuminate each of the segments by two or more colors of emitted light; and the indicator control means controls the light emission of the LEDs to display the variable on the indicator by selectively lighting a specific segment among the segments while changing the emitted light color of the segment in the set value range in the hysteretic manner.

11. A vehicle display device according to claim 10, wherein the segments of the indicator are arranged in a nearly linear shape extending in a fixed direction so as to consecutively display the variable concerning vehicle state.

12. A vehicle display device according to claim 10, wherein the segments of the indicator are arranged so as to digitally display the variable concerning the vehicle state.

13. A vehicle display device according to claim 9, wherein:

the indicator includes a single light emission surface displaying the variable concerning the vehicle state by the emitted light color;

the LEDs are disposed on the light emission surface and illuminate the light emission surface by two or more colors of emitted light; and the indicator control means controls the light emission of the LEDs to display the variable on the indicator by lighting the light emission surface, while gradually changing the emitted light color of the light emission surface in the set value range in the hysteretic manner.

14. A vehicle display device according to claim 13, wherein the indicator control means gradually changes the emitted light color of the LEDs from an emitted light color before a color change to an emitted light color after a color change via a mixed color thereof.

15. A vehicle display device comprising:

an indicator including a plurality of segments arranged so as to display a variable concerning a vehicle state in the form of a number;

light emitting means, including two or more kinds of color changing LEDs radiating different hues of rays from each other, for illuminating at least one of the segments and a periphery of the indicator by the LEDs; and indicator control means for controlling said light emitting means to display a value of the variable on the indicator in the form of a number by selectively illuminating the segments and for controlling one or more colors of the color changing LEDs to emit light and to orderly change the emitted light color thereof in two or more colors according to the value of the variable.

16. A vehicle display device stated in claim 15 wherein:

the LEDs are disposed on each of the segments; and the indicator control means controls one or more colors of the color changing LEDs to emit light so as to display the value of the variable in the form of a number by selectively illuminating the segments, while orderly changing the emitted light color of the displayed number in two or more colors according to the value of the variable.

17. A vehicle display device according to claim 15 wherein:

the LEDs are disposed on each of the segments; and the indicator control means includes a reference value input circuit for inputting a desired reference value concerning the variable;

the indicator control means controlling one or more colors of the color changing LEDs to emit light to display a value of the variable in the form of a number by selectively illuminating the segments; and the indicator control means comparing the value of the variable with the reference value and selectively lighting the color changing LEDs so as to orderly change the emitted light color of the displayed number in two or more colors according to the value of the variable when the value of the variable exceeds the reference value.

18. A vehicle display device according to claim 15, wherein:

the color changing LEDs include a red LED radiating a red light, a green LED radiating a green light, and a blue LED radiating a blue light; and the emitted light color of the light emitting means includes a white light as a mixed color of the red, green and blue LEDs.

19. A vehicle display device according to claim 15 wherein:

the light emitting means further includes a number indicating LED and a sub-display zone, the number indicating LED being disposed on each of the segments to illuminate the segment in a desired indicating color, the sub-display zone having the color changing LEDs arranged around the segment so as to emit light in two or more colors of hues;

the indicator control means controls light emission of the number indicating LED to display the value of the variable on the indicator in a number by selectively illuminating the segments; and the indicator control means further includes a sub-display zone emission control circuit for deciding the value of the variable, and selectively lighting the color changing LEDs corresponding to the decided value of the variable so as to orderly change an emitted light color of the sub-display zone in two or more colors according to the value of the variable.

\* \* \* \* \*